US012470811B2

(12) United States Patent
 Suzuki

(10) Patent No.: US 12,470,811 B2
(45) Date of Patent: Nov. 11, 2025

(54) INFORMATION PROCESSING APPARATUS, INFORMATION PROCESSING METHOD, AND MOVING DEVICE

(71) Applicant: SONY GROUP CORPORATION, Tokyo (JP)

(72) Inventor: Kyouhei Suzuki, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 212 days.

(21) Appl. No.: 18/257,955

(22) PCT Filed: Nov. 11, 2021

(86) PCT No.: PCT/JP2021/041505
§ 371 (c)(1),
(2) Date: Jun. 16, 2023

(87) PCT Pub. No.: WO2022/137866
PCT Pub. Date: Jun. 30, 2022

(65) Prior Publication Data
US 2024/0056679 A1    Feb. 15, 2024

(30) Foreign Application Priority Data
Dec. 24, 2020 (JP) ................................. 2020-214442

(51) Int. Cl.
*H04N 23/60* (2023.01)
*H04N 23/695* (2023.01)

(52) U.S. Cl.
CPC ........... *H04N 23/64* (2023.01); *H04N 23/695* (2023.01)

(58) Field of Classification Search
CPC ...... H04N 23/64; H04N 23/695; H04N 5/222; G01C 21/34
See application file for complete search history.

(56) References Cited

U.S. PATENT DOCUMENTS

| 10,553,122 | B1 * | 2/2020 | Gilboa-Amir ..... G06Q 10/0832 |
| 2017/0301109 | A1 * | 10/2017 | Chan ..................... B64U 50/19 |

FOREIGN PATENT DOCUMENTS

| JP | 01-078581 A | 3/1998 |
| JP | 2018-152737 A | 9/2018 |

OTHER PUBLICATIONS

International Search Report and Written Opinion of PCT Application No. PCT/JP2021/041505, issued on Feb. 1, 2022, 08 pages of ISRWO.

\* cited by examiner

*Primary Examiner* — Christopher K Peterson
(74) *Attorney, Agent, or Firm* — CHIP LAW GROUP

(57) ABSTRACT

Provided is an information processing apparatus that includes a control unit. The control unit controls a photographing range of an imaging unit based on a difference between a photographing plan of the imaging unit and an actual photographing state estimated from sensor information. The photographing plan includes information indicating a movement trajectory and a photographing attitude of the imaging unit.

9 Claims, 18 Drawing Sheets

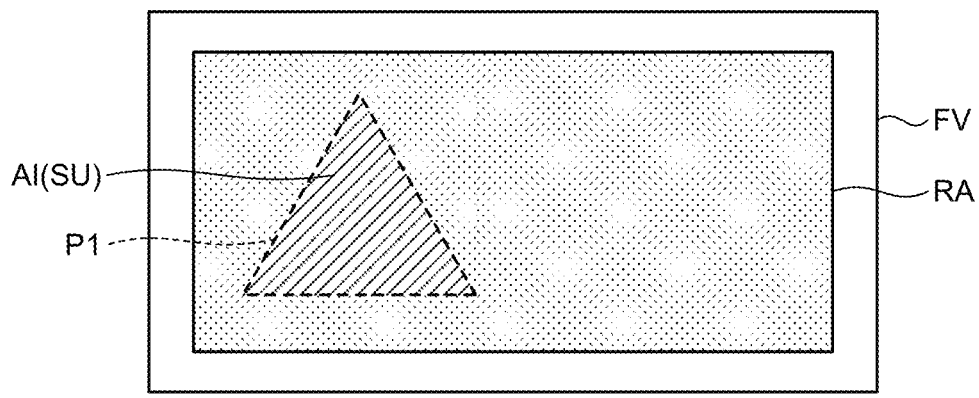
FIG. 13A
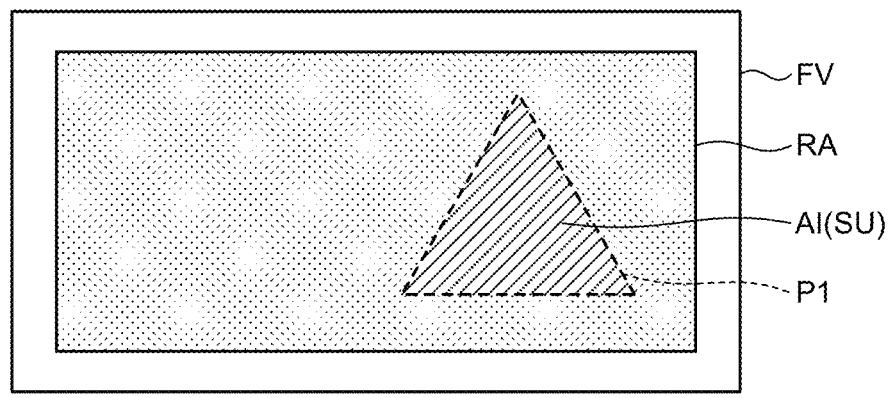
FIG. 13B
FIG. 14
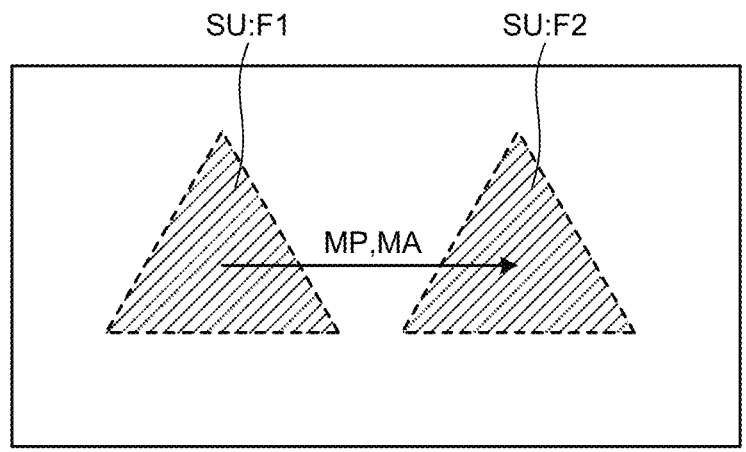

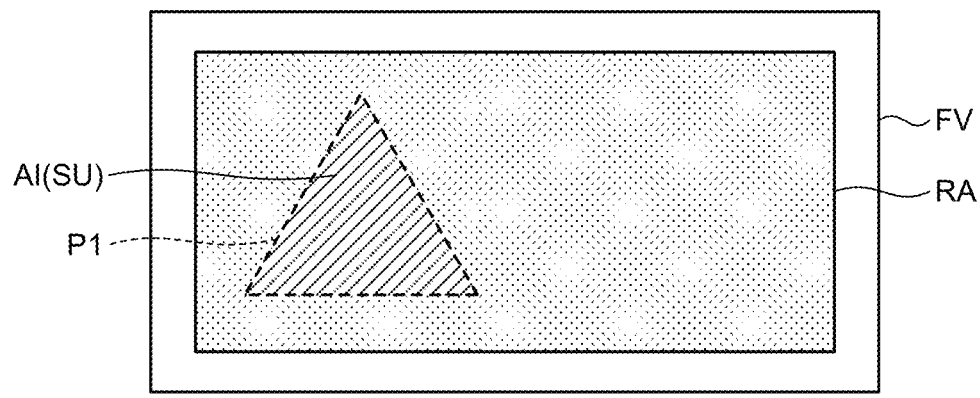
FIG. 15A
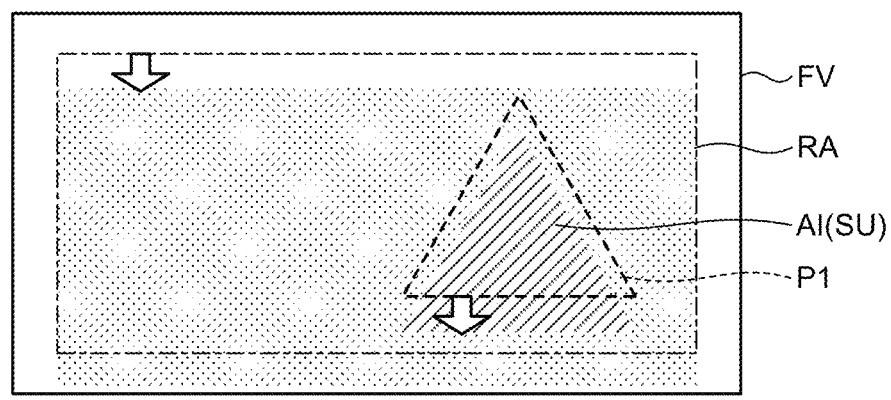
FIG. 15B
FIG. 16
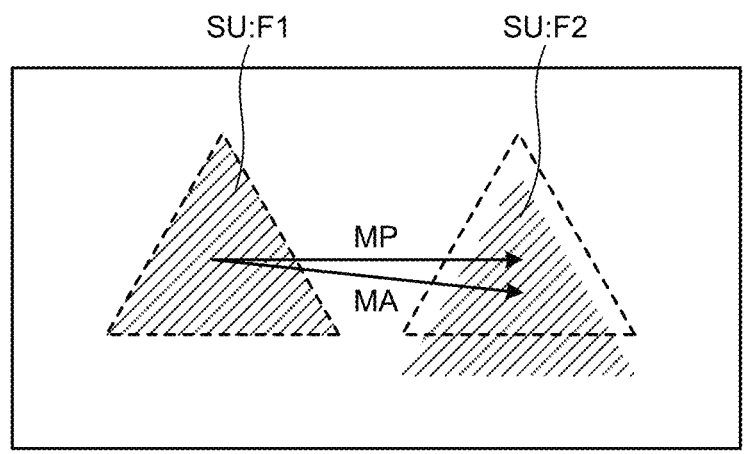

INFORMATION PROCESSING APPARATUS, INFORMATION PROCESSING METHOD, AND MOVING DEVICE

CROSS REFERENCE TO RELATED APPLICATIONS

This application is a U.S. National Phase of International Patent Application No. PCT/JP2021/041505 filed on Nov. 11, 2021, which claims priority benefit of Japanese Patent Application No. JP 2020-214442 filed in the Japan Patent Office on Dec. 24, 2020. Each of the above-referenced applications is hereby incorporated herein by reference in its entirety.

FIELD

The present invention relates to an information processing apparatus, an information processing method, a program, and a moving device.

BACKGROUND

A blur correction technology for correcting an image blur is known. The blur is caused by shaking of an imaging unit at the time of photographing. When shaking of a camera is detected at the time of photographing, the image blur caused by shaking of the camera is corrected.

CITATION LIST

Patent Literature

Patent Literature 1: JP H01-078581 A

SUMMARY

Technical Problem

In a music event or the like, there is a case where photographing is performed while a camera is moved by a moving mechanism. A camera position and a photographing attitude are programmed in advance according to a progress of the event. There is a case where the camera position and attitude greatly change according to a programmed photographing plan. In a conventional blur correction technology, such intended camera movement is also corrected.

Therefore, the present disclosure proposes an information processing apparatus, an information processing method, a program, and a moving device capable of acquiring appropriate image recording data according to a photographing plan.

Solution to Problem

According to the present disclosure, an information processing apparatus is provided that comprises a control unit configured to control a photographing range of an imaging unit based on a difference between a photographing plan of the imaging unit and an actual photographing state estimated from sensor information. According to the present disclosure, an information processing method in which an information process of the information processing apparatus is executed by a computer, and a program causing a computer to implement the information process of the information processing apparatus are provided. According to the present disclosure, a moving device is provided that comprises; an imaging unit; and the information processing apparatus.

BRIEF DESCRIPTION OF DRAWINGS

FIGS. 13A and 13B are diagrams illustrating an example of a blur correction process.

FIG. 14 is a diagram illustrating an example of the blur correction process.

FIGS. 15A and 15B are diagrams illustrating an example of the blur correction process.

FIG. 16 is a diagram illustrating an example of the blur correction process.

FIG. 18 is a diagram illustrating an example of a hardware configuration of an operation instruction device or the like.

DESCRIPTION OF EMBODIMENTS

Hereinafter, embodiments of the present disclosure will be described with reference to the drawings. In each of the following embodiments, same parts are given the same reference signs to omit redundant description.

The present disclosure will be described according to the following order of items.

Figure 1:
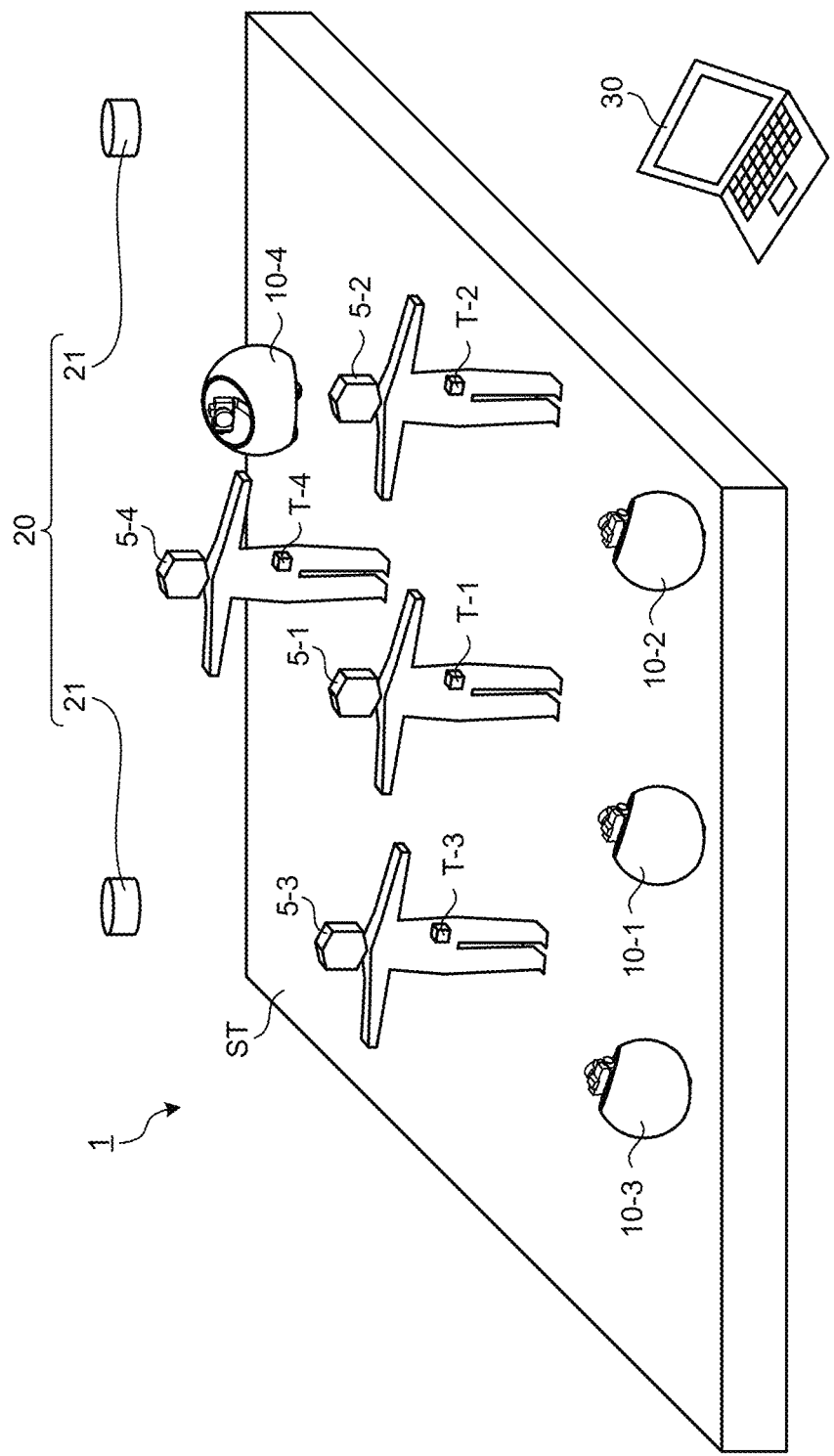
FIG. 1 is a diagram illustrating an example of a schematic configuration of an imaging system according to an embodiment.

1. Embodiment
1.1 Example of schematic configuration
1.2 Example of movement operation and imaging operation 1.3 Example of light emission operation
1.4 Example of illumination operation
1.5 Correction of unintended blur
1.6 Example of process
1.7 Example of hardware configuration
2. Effects
3. Modifications
3.1 First modification
3.2 Second modification
3.3 Third modification
3.4 Fourth modification 1. Embodiment 1.1 Example of Schematic Configuration FIG. 1 is a diagram illustrating an example of a schematic configuration of an imaging system according to an embodiment. In this example, the imaging system is used for streaming distribution of a live music event. A plurality of performers 5 is performing on a stage ST. Each of the plurality of performers 5 is referred to as a performer 5-1 and so on in order to distinguish each of the performers 5.

An imaging system 1 includes a moving device 10, a tag T, an environment sensor 20, and an operation instruction device 30. The moving device 10 may be a plurality of moving devices 10, and in this example, the same number of moving devices 10 as the number of the performers 5 is used. Each of the moving devices 10 is referred to as a moving device 10-1 and so on in order to distinguish each of the moving devices 10.

The moving device 10 is a movable imaging device that operates to capture an image of a subject. The subject is mainly the performer 5, but other objects may be subjects. Since there are a plurality of moving devices 10, various combinations of the moving devices 10 and the subjects are possible. The moving device 10 images the performer 5 while moving. At least a part of the operation of the moving device 10 is an autonomous operation that automatically operates to avoid collision (obstacle avoidance) or the like with a surrounding environment without requiring a real-time manual operation. The moving device 10 transmits an imaging result (image) to the operation instruction device 30 in real time. Further details of the moving device 10 will be described later.

The tag T is used to acquire position information of the performer 5. Each performer 5 has the tag T. An example of the tag T is a transmitter that emits a pulse signal, a beacon signal, or the like. The tag T included in each performer 5 is referred to as a tag T-1 and so on in the drawings.

The environment sensor 20 recognizes (detects) an environment in which the moving device 10 is arranged. The recognition of the environment includes recognition of the position of the performer 5. Any sensor capable of recognizing the position of the performer 5 may be included in the environment sensor 20. In this example, the environment sensor 20 recognizes the position of the performer 5 using a sensor group 21. Position information of the performer 5 recognized by the environment sensor 20 is transmitted to the operation instruction device 30 in real time. Further details of the environment sensor 20 will be described later.

The operation instruction device 30 remotely controls the moving device 10 and performs image distribution in real time. The operation instruction device 30 may be realized using a general-purpose computer, and is a laptop computer in this example. A tablet terminal may also be used. Further details of the operation instruction device 30 will be described later.

Figure 2:
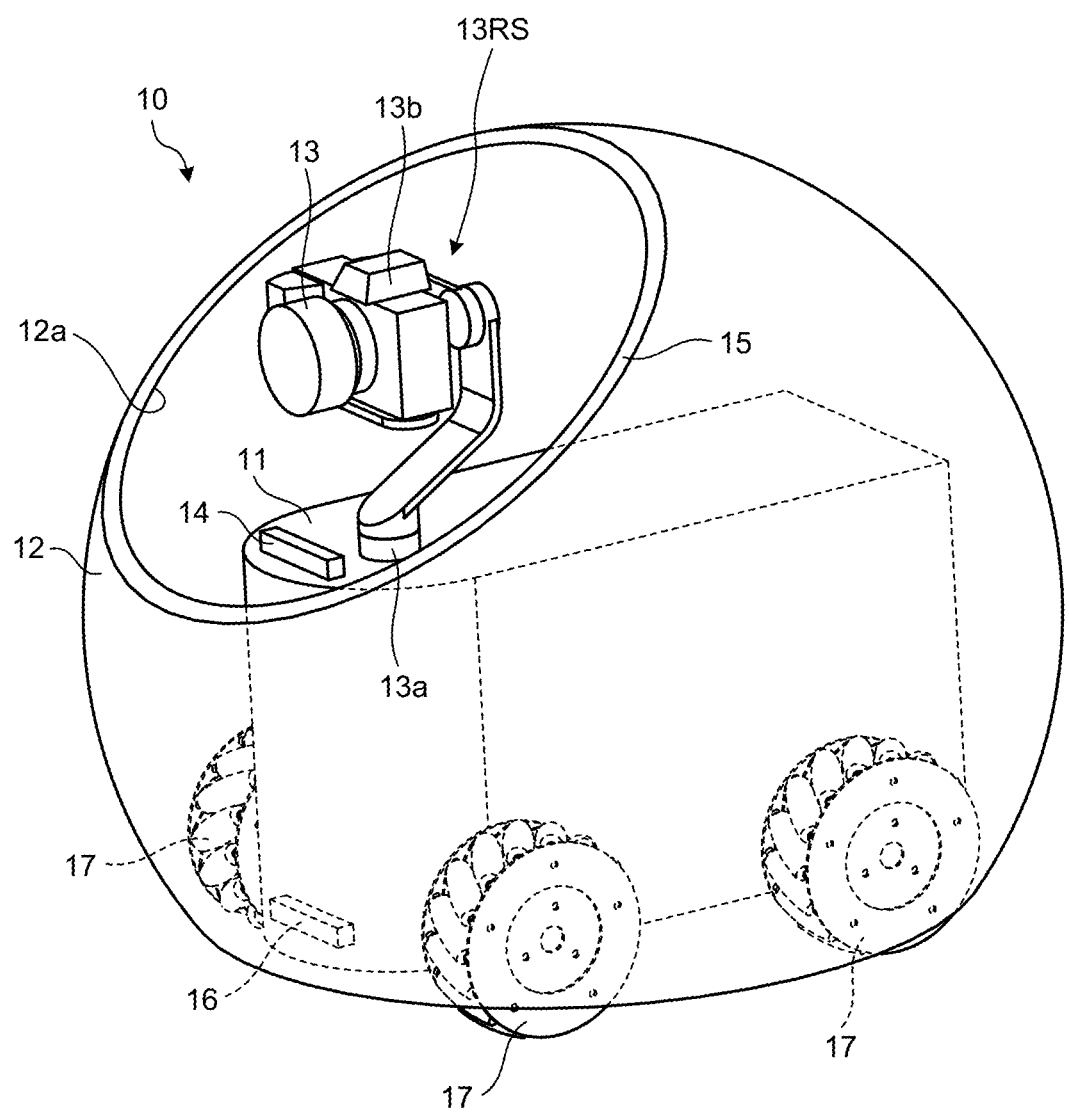
FIG. 2 is a diagram illustrating an example of a schematic configuration of a moving device.

FIG. 2 is a diagram illustrating an example of a schematic configuration of the moving device. Among components of the moving device 10, in particular, a housing 11, a housing 12, an imaging unit 13, a sensor 14, a light emitting unit 15, an illumination unit 16, and a moving mechanism 17 are illustrated with reference signs. Note that a portion hidden in the housing 12 is drawn by a broken line.

The housing 11 is an inner housing located inside the housing 12. In this example, among the components of the illustrated moving device 10, the imaging unit 13, the illumination unit 16, and the moving mechanism 17 are provided in the housing 11. A communication device, a control unit (control board), wiring, a battery, and the like (not illustrated) are accommodated in the housing 11.

The housing 12 is an outer housing located outside the housing 11. In this example, among the components of the illustrated moving device 10, the light emitting unit 15 is provided in the housing 12. The housing 12 may have flexibility, for example, so that impact at the time of collision can be reduced. A material, a thickness, and the like of the housing 12 are appropriately selected. An opening is formed in an upper part of the housing 12 so as not to hinder imaging by the imaging unit 13 and recognition by the sensor 14. A portion forming the opening (rim of the opening) is referred to as an opening portion 12a in the drawing. The opening portion 12a has an annular shape (ring shape), and more specifically, a circular ring shape. The housing 12 also has an opening it its lower part.

The imaging unit 13 is disposed on the housing 11. The imaging unit 13 is provided on the housing 11 via a rotation support mechanism 13RS including a neck rotation shaft 13a and a three-axis gimbal 13b so that the position, direction, and the like can be changed. The imaging unit 13 is, for example, a charge coupled device (CCD) camera that can be controlled by parameters. Examples of the parameters include a zoom magnification, a depth of field, and an angle of view.

The sensor 14 is disposed on the housing 11. The sensor 14 recognizes a surrounding environment of the moving device 10. The recognition of the surrounding environment includes recognition of objects existing in the surrounding. The recognition of objects includes recognition of an object type, recognition of an object position, and the like. Examples of the object type include the performer 5, another moving device 10, and an obstacle. Examples of the object position include a relative position (distance, direction, etc.) of the object with respect to the moving device 10 and the position (coordinates) of the object on the stage ST.

Any sensor for recognizing the object may be included in the sensor 14. Examples of such a sensor are an image sensor and a distance measuring sensor. The imaging unit 13 may also be used as the image sensor.

The sensor 14 also recognizes the position of the moving device 10. Any sensor capable of recognizing the position of the moving device 10 may be included in the sensor 14. An example of such a sensor is an indoor positioning sensor.

In addition, various sensors for recognizing a moving distance, a moving speed, a moving direction, an attitude, and the like of the moving device 10 may be included in the sensor 14. Examples of such a sensor are an inertial measurement unit (IMU) sensor, an acceleration sensor, and an angular velocity sensor.

The light emitting unit 15 is provided along the opening portion 12a of the housing 12. For example, the light emitting unit 15 is provided on an inner surface (e.g., on a cut surface) of the opening portion 12a. When the opening portion 12a has the annular shape as described above, the light emitting unit 15 is disposed along the annular shape of the housing 12. Note that the light emitting unit 15 may be disposed in a portion other than the opening portion 12a of the housing 12 or may be disposed on the entire surface of the housing 12. An example will be described later with reference to FIGS. 39 to 41. An example of a light source of the light emitting unit 15 is a plurality of point light sources arranged along the opening portion 12a. An example of the point light source is a light emitting diode (LED). A plurality of point light sources that emit light in different colors may be arranged. The light source may be covered with a smoke cover. The light emitting unit 15 performs various light expressions. Details of the light expression will be described later.

The illumination unit 16 is provided in a lower part of the housing 11. The illumination unit 16 includes illumination for projection and the like. For example, the illumination unit 16 illuminates forward and downward directions of the moving device 10 through an opening formed in the lower part of the housing 12, and performs projection.

The moving mechanism 17 is provided in a lower part of the housing 11. The moving mechanism 17 moves the moving device 10 in an arbitrary direction on the stage ST. In the example illustrated in FIG. 2, the moving mechanism 17 is a plurality of rollers. The rollers are incorporated in, for example, a carriage (not illustrated) and abuts on the stage ST through the opening created in the lower part of the housing 12. The moving mechanism 17 may be configured to include, for example, the Mecanum wheel to enable omnidirectional movement of the moving device 10. As a result, the moving device 10 can escape from a state of being sandwiched between persons without unnecessary rotation or can be freely positioned in complicated equipment.

Figure 3:
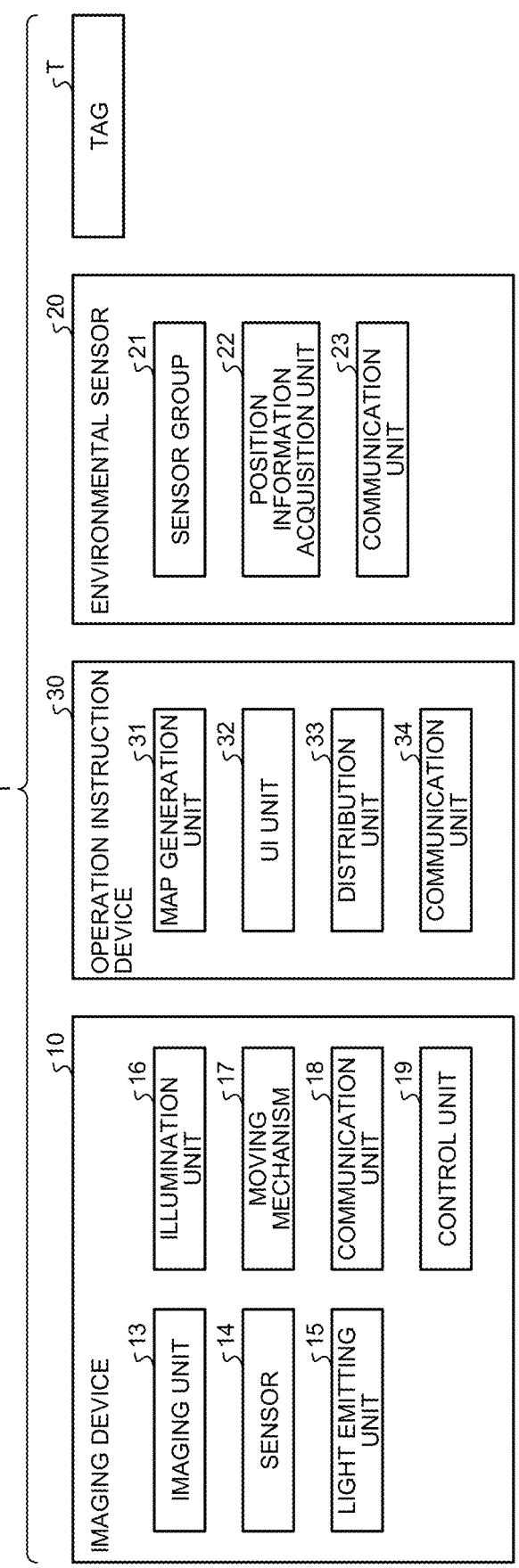
FIG. 3 is a diagram illustrating an example of functional blocks of the imaging system.

FIG. 3 is a diagram illustrating an example of functional blocks of the imaging system. Some representative functional blocks in the moving device 10, the environment sensor 20, and the operation instruction device 30 are exemplified.

The moving device 10 includes the imaging unit 13, the sensor 14, the light emitting unit 15, the illumination unit 16, the moving mechanism 17, a communication unit 18, and a control unit 19. The housing 11 and the housing 12 in FIG. 2 are not illustrated in FIG. 3. The imaging unit 13, the sensor 14, the light emitting unit 15, the illumination unit 16, and the moving mechanism 17 are as described above with reference to FIG. 2. As to the sensor 14, again, the sensor 14 recognizes the position of the performer 5, the position of the moving device 10, and the like, and acquires the position information of the performer 5, the position information of the moving device 10, and the like.

The communication unit 18 transmits and receives information to and from the operation instruction device 30. For communication, short-range wireless communication such as wireless LAN may be used. The communication unit 18 transmits an image to the operation instruction device 30 in real time. In addition, the communication unit 18 transmits a recognition result of the sensor 14, particularly the position information of the performer 5 and the position information of the moving device 10, to the operation instruction device 30 in real time.

The control unit 19 controls the operation of the moving device 10 by controlling each element of the moving device 10. The operation of the moving device 10 includes a movement operation, an imaging operation, a light emission operation, and an illumination operation. Control of the movement operation includes control of the moving direction, the moving speed, and the like of the moving device 10. Control of the imaging operation includes control of direction of the imaging unit 13 (camera direction), parameters, and the like. Control of the light emission operation includes control of a light expression performed by the light emitting unit 15. Control of the illumination operation includes control of projection performed by the illumination unit 16.

The control unit 19 controls the operation of the moving device 10 based on a photographing plan set according to the embodiment. The photographing plan defines the operation of the moving device 10. The photographing plan may be set before performance of the performer 5 starts, or may be set while performance is performed. In the latter case, the photographing plan may be changed (updated) at any time. The photographing plan is set by the operation instruction device 30 as described later.

The photographing plan may define the operation of the plurality of moving devices 10. The operation of each of the moving devices 10 is defined such that each of the moving devices 10 operates in conjunction with each other. Accordingly, the plurality of moving devices 10 cooperatively operates.

The control unit 19 controls the operation (movement operation and imaging operation) of the moving device 10 such that the moving mechanism 17 moves the moving device 10 and the imaging unit 13 captures an image of the performer 5 recognized by the sensor 14 according to the photographing plan set. At least a part of the operation of the moving device 10 is an autonomous operation. The control unit 19 automatically controls the operation of the moving device 10 so as to achieve the photographing plan.

The photographing plan has a timeline for each moving device 10. A plurality of events can be arranged in the timeline. The event has information on a start time and an end time. The event includes information on a movement trajectory of the imaging unit 13 and a movement trajectory of a photographing target. When the moving device 10 starts the operation, an event is transmitted from the operation instruction device 30 to the moving device 10 according to the timeline. During the event, the position of the imaging unit 13 is controlled to move along the set movement trajectory. Furthermore, the photographing attitude of the imaging unit 13 is controlled to face the position of the photographing target.

Based on or instead of the photographing plan, the control unit 19 may control each of the movement operation, the imaging operation, the light emission operation, and the illumination operation according to another operation. For example, the control unit 19 causes the light emitting unit 15 to perform light expression according to the movement operation, the imaging operation, or the illumination operation, or causes the illumination unit 16 to perform projection according to the movement operation, the imaging operation, or the light emission operation.

A specific example of the control of the operation of the moving device 10 by the control unit 19 will be described later again with reference to FIG. 4 and subsequent drawings.

The tag T is as described above with reference to FIG. 1, and thus the description thereof will not be repeated here.

The environment sensor 20 includes the sensor group 21, a position information acquisition unit 22, and a communication unit 23.

The sensor group 21 is a plurality of sensors whose timings are synchronized by cable connection or the like. The sensor may be a receiver that receives a transmission signal from the tag T.

The position information acquisition unit 22 recognizes a distance and a direction to the tag T based on the transmission signal from the tag T received by each sensor of the sensor group 21. Since the position of the sensor group 21 is known, the position of the tag T and the position of the performer 5 having the tag T are recognized. Various known methods may be used for recognition, and a detailed description thereof will be omitted here. The position information acquisition unit 22 acquires a position of recognized performer 5 as the position information of the performer 5.

The communication unit 23 transmits the position information acquired by the position information acquisition unit 22 to the operation instruction device 30 in real time.

Note that the position information acquired by the position information acquisition unit 22 may be transmitted to the moving device 10 via the operation instruction device 30 or directly from the environment sensor 20. For example, in a case where the moving device 10 has not yet recognized the position of the performer 5, the position information from the environment sensor 20 may be used as a reference.

The operation instruction device 30 includes a map generation unit 31, an UI unit 32, a distribution unit 33, and a communication unit 34.

The map generation unit 31 generates a map indicating the position of the moving device 10 and the position of the performer 5 in real time. The map also includes topographical information (stage ST in the example in FIG. 1) and the like. The position of the moving device 10 is acquired as position information transmitted by the moving device 10. The position of the performer 5 is obtained as position information transmitted by the moving device 10 and the environment sensor 20. Even when the moving device 10 does not recognize the position of the performer 5, the position information transmitted by the environment sensor 20 is present, so that the position information of the performer 5 can be reliably obtained. The map generated by integrating the position information from the moving device 10 and the environment sensor 20 can also be referred to as an integrated map.

The UI unit 32 provides a user interface that presents information to the user, accepts a user operation, and the like. The user interface may be provided while displaying the map generated by the map generation unit 31. The UI unit 32 includes, for example, a display and an operation panel (which may be a touch panel, etc.). In addition, an operation lever, a fader, and the like may be included in the UI unit 32. Some examples of use of the UI unit 32 by the user will be described.

For example, the user uses the UI unit 32 that displays the map to set the photographing plan. The set photographing plan is transmitted to the moving device 10, and the moving device 10 operates according to the photographing plan. As described above, the map is the integrated map generated by integrating the position information from the moving device 10 and the environment sensor 20. By setting the photographing plan using the UI unit 32 that displays such a map, the moving device 10 operates based on the recognition result of the sensor 14 of the moving device 10 and the recognition result of the environment sensor 20. As a result, for example, the operation accuracy of the moving device 10 can be improved as compared with a case where the moving device 10 operates based only on the recognition result of 14 of the moving device 10.

As described above, the photographing plan may be updated. In this case, information regarding the update or the like (e.g., updated photographing plan) is transmitted to the moving device 10 so that the update or the like of the photographing plan is reflected in the operation of the moving device 10 in real time.

For example, the user manually gives instruction for the operation of the moving device 10 using the UI unit 32. This enables the manual operation of the moving device 10. Examples of the instruction include panning, tilting, and zooming of the imaging unit 13 of the moving device 10, and adjustment of the moving speed of the moving device 10. The instruction is transmitted to the moving device 10, and the moving device 10 operates according to the instruction in real time.

For example, the user uses the UI unit 32 to select an image. The image to be used for distribution or the like is selected from images obtained from the plurality of moving devices 10.

The distribution unit 33 distributes the image. The distribution may be live streaming distribution. For example, the distribution unit 33 distributes the image by transmitting the image to a distribution server (not illustrated).

The communication unit 34 transmits and receives information to and from the moving device 10, the environment sensor 20, and the like. Examples of the information are the position information, the photographing plan, the instruction for the manual operation, and the image described above.

1.2 Example of Movement Operation and Imaging Operation

The moving device 10 will be described again. As described above, the control unit 19 of the moving device 10 controls the operation of the moving device 10. Some examples of the movement operation and the imaging operation (movement by the moving mechanism 17 and imaging by the imaging unit 13) will be described with reference to FIGS. 4 to 9 together with an example of setting of the photographing plan that defines the operation.

Figure 4:
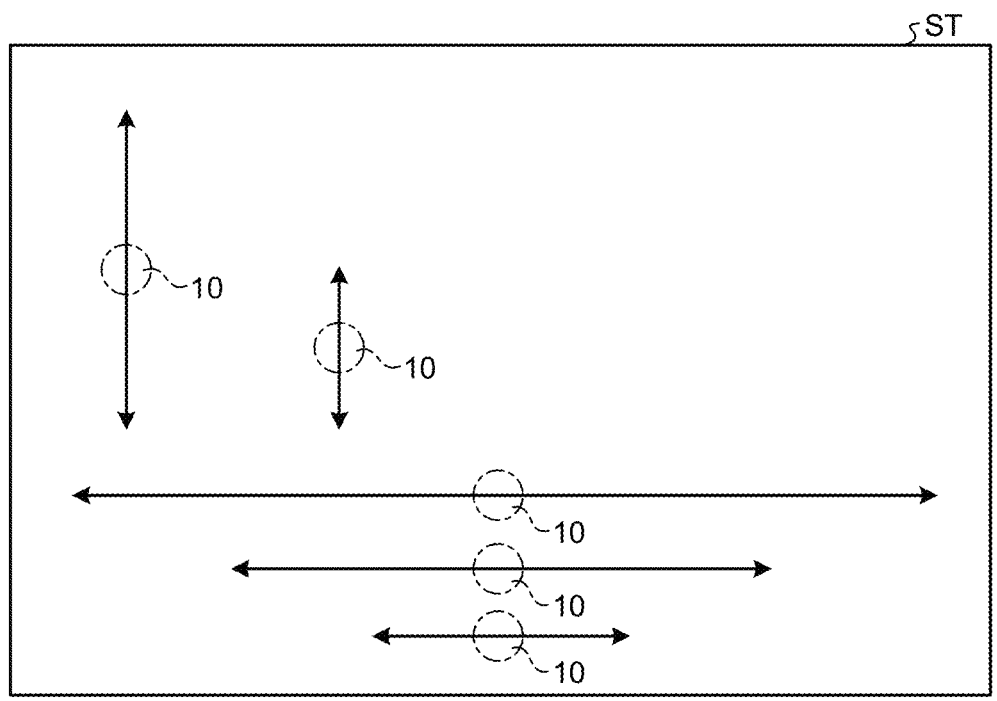
FIG. 4 is a diagram illustrating an example of a movement operation and/or an imaging operation.

In the example illustrated in FIG. 4, the control unit 19 moves the moving device 10 along a virtual route (virtual rail) set. FIG. 4 illustrates a setting example of the photographing plan that defines such an operation of the moving device 10. The user uses the UI unit 32 that displays a map as illustrated in the drawing to set the virtual route on the stage ST. For example, a plurality of virtual routes having different directions and lengths, as indicated by a one-dot chain line arrow, can be set. The plurality of moving devices 10 and the plurality of virtual routes may be set in various combinations.

The moving speed and the moving pattern may be set together with the virtual routes. The moving speed may be set to be different according to a position on each of the virtual routes. Examples of the movement pattern include a one-way movement and a reciprocating movement. A default setting such as the reciprocating movement at a constant speed may be set.

Although it is the manual operation, during the operation of the moving device 10, the moving device 10 can also be immediately moved to a designated position on the virtual route, or can also be caused to stand by at a destination that the moving device 10 has moved to.

Figure 5:
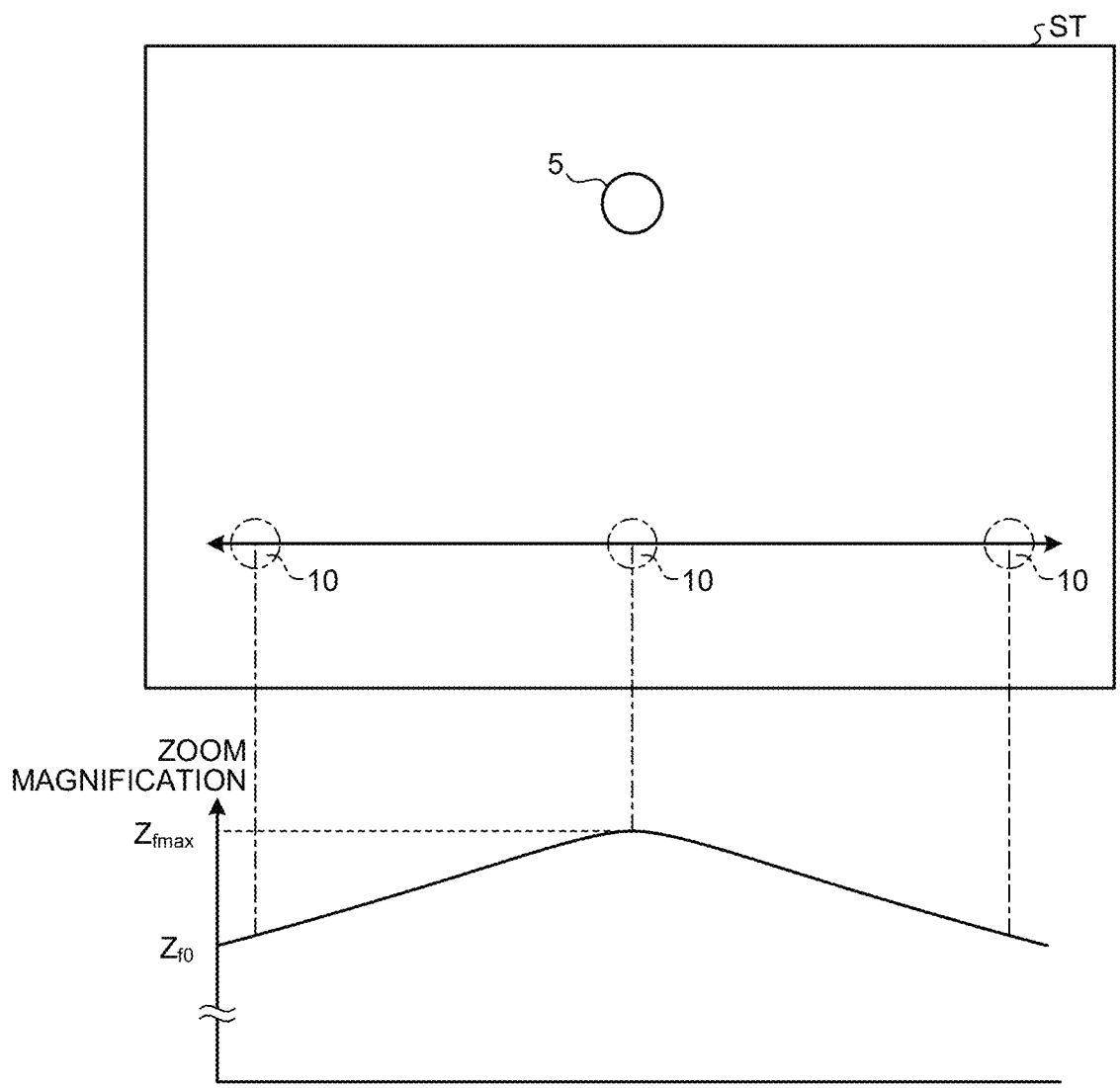
FIG. 5 is a diagram illustrating an example of the movement operation and/or the imaging operation.

In the example illustrated in FIG. 5, the control unit 19 changes an imaging parameter according to the movement of the moving device 10. FIG. 5 illustrates a setting example of the photographing plan that defines such an operation of the moving device 10. As the imaging parameter, a zoom magnification is exemplified. The user uses the UI unit 32 that displays a map as illustrated in the drawing to set the zoom magnification according to the position of the moving device 10 on the virtual route. In this example, the zoom magnification when the moving device 10 is farthest from the performer 5 is a reference value $Z_{f0}$, and the zoom magnification when the moving device 10 is closest to the performer 5 is the maximum value $Z_{fmax}$. As the moving device 10 approaches the performer 5, the zoom magnification increases. However, a change mode of the zoom magnification is not limited to this example. For example, the zoom magnification may continue to increase or decrease as the moving device 10 moves from one end to the other end of the virtual route.

Figure 6:
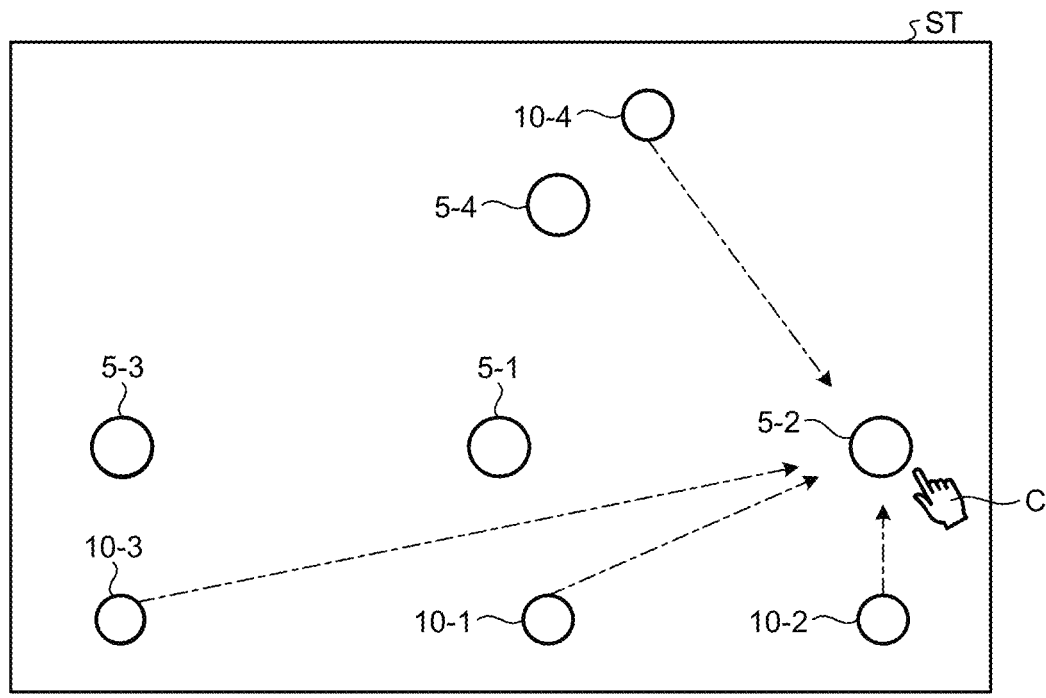
FIG. 6 is a diagram illustrating an example of the movement operation and/or the imaging operation.

In the example illustrated in FIG. 6, the control unit 19 causes the moving device 10 to image a designated performer 5. FIG. 6 illustrates a setting example of the photographing plan that defines such an operation of the moving device 10. The user uses the UI unit 32 that displays a map as illustrated in the drawing to designate the performer 5-2 among the plurality of performers 5 with a cursor C. Each of the moving devices 10 changes its direction to capture an image of the designated performer 5-2 at the center, for example, of the angle of view. An imaging direction of each of the moving devices 10 is schematically indicated by a one-dot chain line arrow. An arbitrary place on the stage ST may be designated without being limited to the performer 5.

Figure 7:
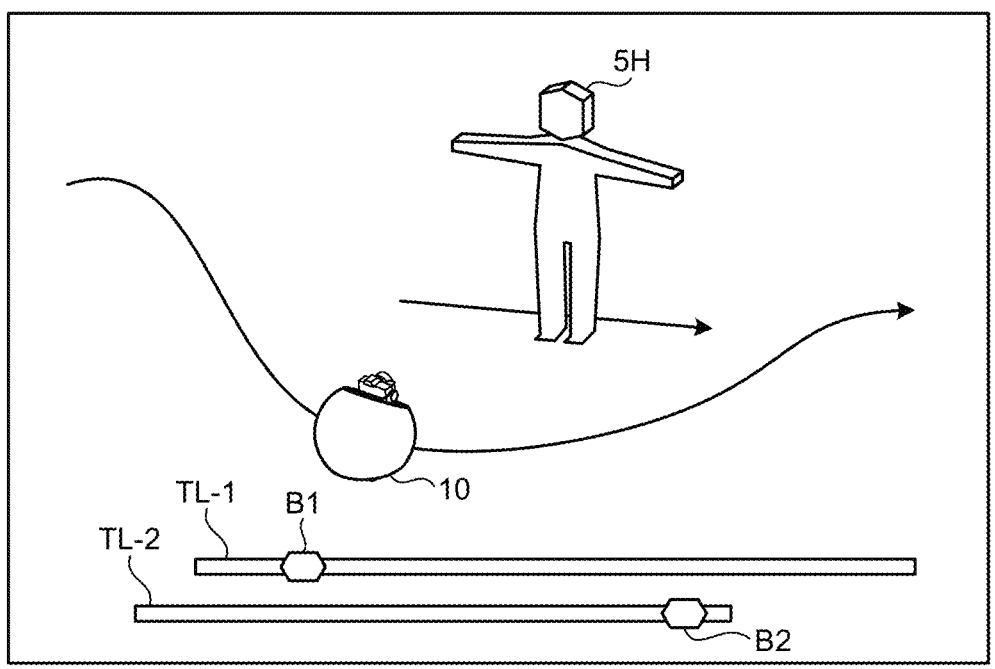
FIG. 7 is a diagram illustrating an example of the movement operation and/or the imaging operation.

In the example illustrated in FIG. 7, the control unit 19 operates the moving device 10 according to performance (song, music, etc.). FIG. 7 illustrates a setting example of the photographing plan that defines such an operation of the moving device 10. The user sets the operation of the moving device 10 with respect to performance of a virtual performer 5H, using the UI unit 32 that displays a map as illustrated in the drawing (map using three-dimensional representation in this example). The performer 5H performs planned performance of the performer 5. In this example, the performance of the performer 5H is represented by a timeline TL1. The operation of the moving device 10 is represented by a timeline TL2. The timeline TL1 and the timeline TL2 are waypoint lines representing time, position, speed, direction, and the like. Any timing in the timeline TL1 can be selected by a bar B1. Any timing in the timeline TL2 can be selected by a bar B2. By defining the operation of the moving device 10 represented in the timeline TL2 in accordance with the performance of the performer 5H represented in the timeline TL1, the operation is associated with the performance (synchronized with music, representation, etc.).

In a case where the user tries to set an operation that cannot be realized, the UI unit 32 may display an error or propose a corrected operation that can be realized. Examples of the operation that cannot be realized include an operation of passing through a place where the moving device 10 cannot move to and an operation requiring movement at an operation speed exceeding the maximum moving speed of the moving device 10.

The operation of the performer 5 during actual photographing may deviate from the operation of the performer 5H. In this case, for example, the moving device 10 may perform an operation different from the operation defined in the timeline TL2 for an amount of deviated operation.

Figure 8:
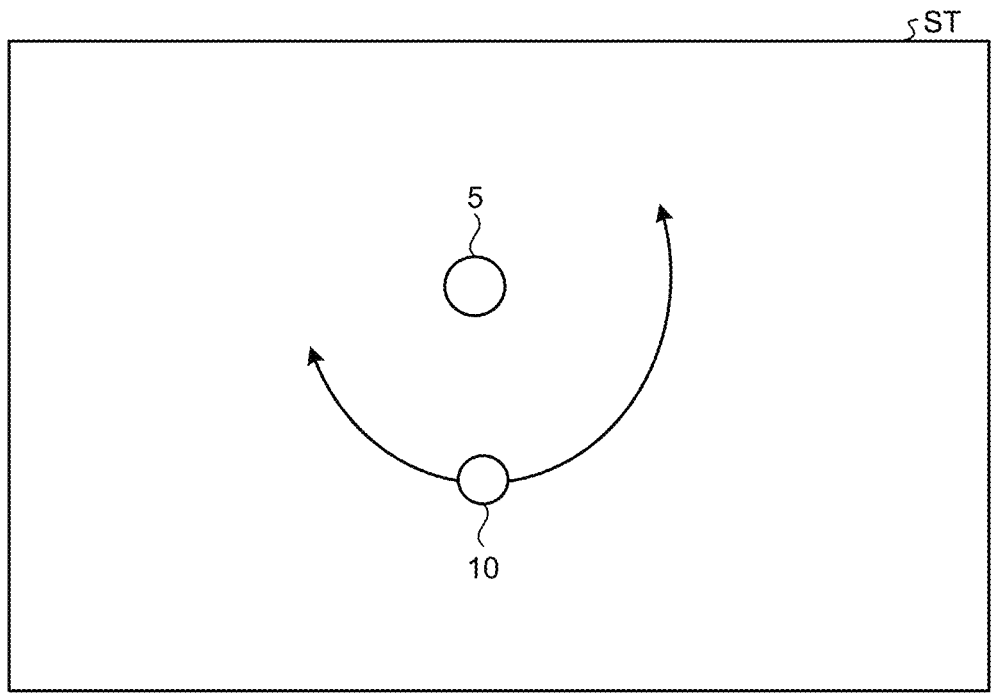
FIG. 8 is a diagram illustrating an example of the movement operation and/or the imaging operation.

In the example illustrated in FIG. 8, the control unit 19 causes the moving device 10 to perform rotational movement (spinning) with respect to the performer 5. FIG. 8 illustrates a setting example of the photographing plan that defines such an operation of the moving device 10. The user uses the UI unit 32 that displays a map as illustrated in the drawing to designate the performer 5 to be imaged and set a distance, a rotation range (angular range), and the like with respect to the performer 5. The moving device 10 images the performer 5 while rotationally moving around the designated performer 5 in a set distance in a set rotation range. The distance and the rotation range may be set by default.

In a case where the user tries to set the rotational movement that cannot be realized, the UI unit 32 may display an error or propose a corrected rotational movement that can be realized. An example of the rotational movement that cannot be realized is a rotational movement with respect to the performer 5 playing a drum in a stepped place.

Figure 9:
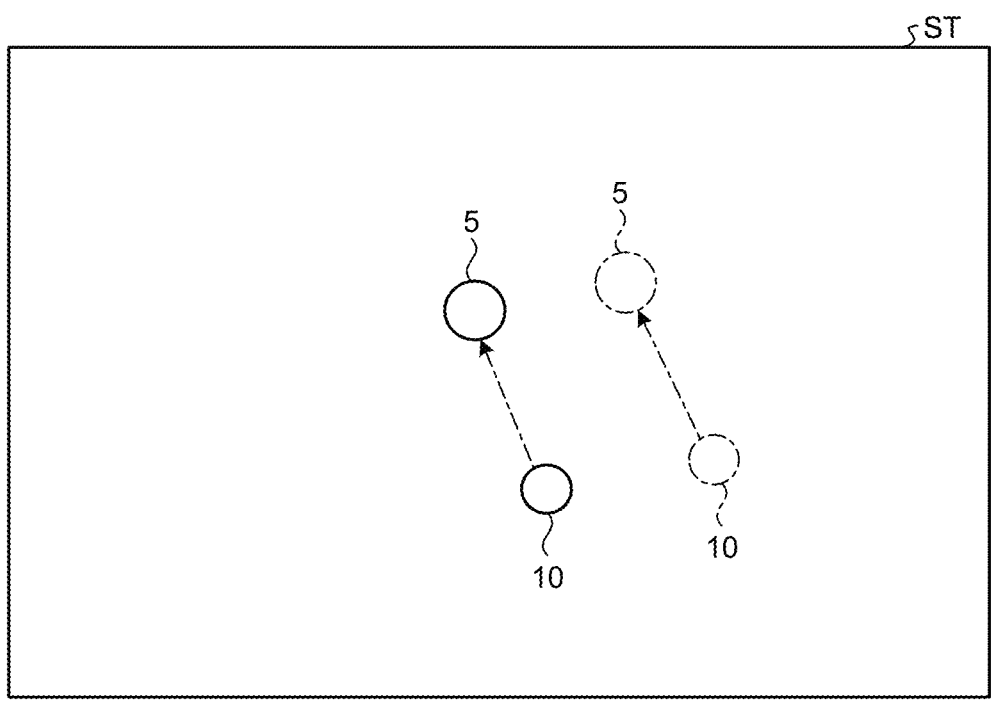
FIG. 9 is a diagram illustrating an example of the movement operation and/or the imaging operation.

In the example illustrated in FIG. 9, the control unit 19 causes the moving device 10 to track and photograph the performer 5. FIG. 9 illustrates a setting example of the photographing plan that defines such an operation of the moving device 10. The user uses the UI unit 32 that displays a map as illustrated in the drawing to designate the performer 5. The moving device 10 follows the designated performer 5 and continues to capture an image of the performer 5. For example, when the performer 5 moves to a position indicated by a white circle of a one-dot chain line, the moving device 10 also moves together. Arrows schematically indicate imaging directions of the respective moving devices 10.

In the tracking and photographing operation, the moving device 10 may move to maintain a distance and a direction (relative position) with respect to the performer 5. The moving device 10 may also move to change the direction while maintaining the distance to the performer 5. By changing the direction, a performance effect such as Perlin noise can be obtained. A photographing composition, such as which part of the performer 5 is to be imaged, may also be changed as appropriate during the tracking photographing operation. The moving device 10 may image the performer 5 while moving in parallel with the performer 5 or moving ahead of the performer 5. Such imaging by parallel movement and preceding movement is also an aspect of the tracking and photographing operation.

The photographing plan combining all operations including the above-described movement operation and imaging operation may be set. For example, it is also possible to set the photographing plan in which the moving device 10 changes the direction so as to track the performer 5 while moving on the virtual route at a specified speed and performing imaging (photographing programmable rail).

In a case where the plurality of moving devices 10 simultaneously perform imaging, the control unit 19 may control the operation of the moving devices 10 so as not to image other moving devices 10.

Figure 10:
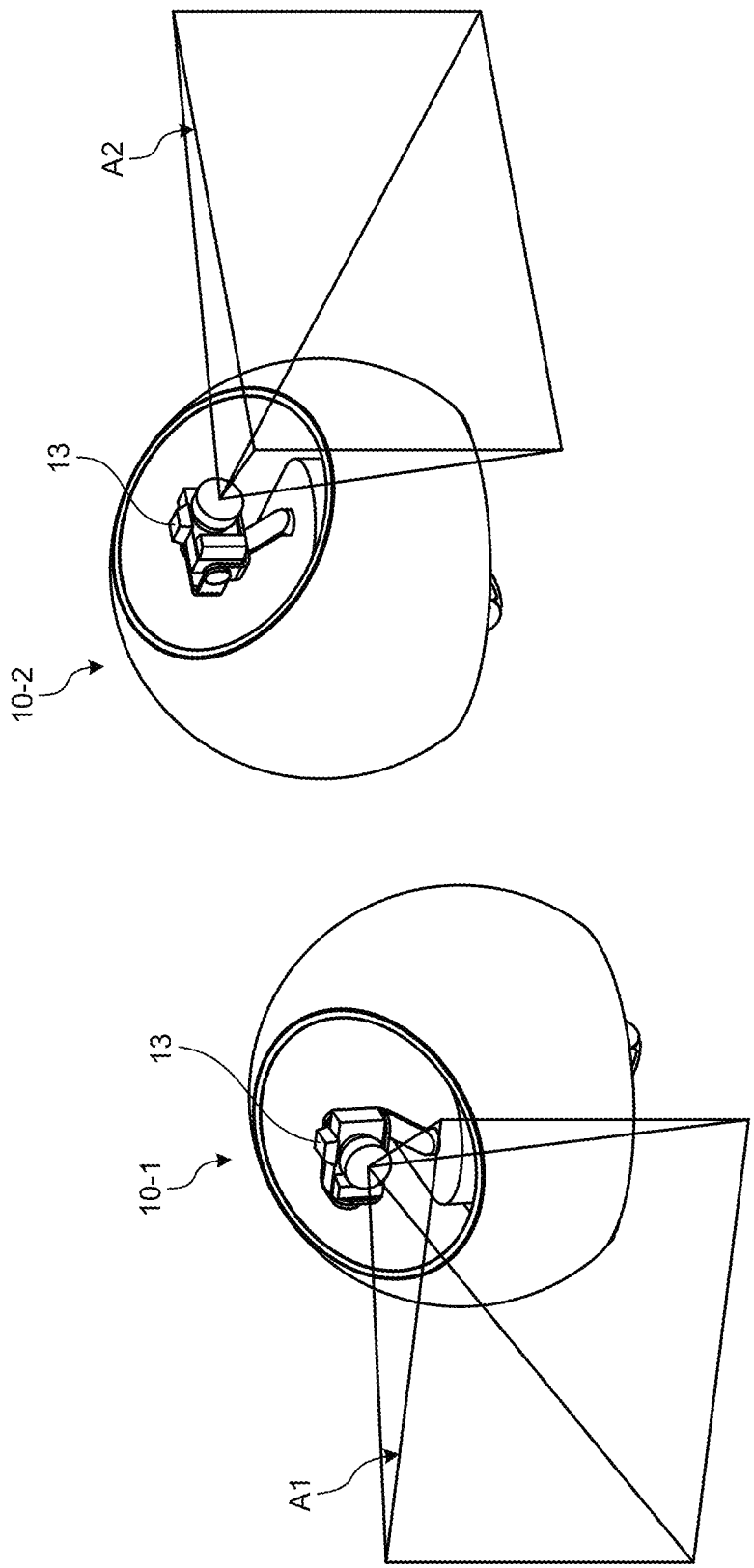
FIG. 10 is a diagram illustrating an example of imaging ranges of a plurality of moving devices.

FIG. 10 is a diagram illustrating an example of imaging ranges of a plurality of moving devices. In this example, the moving device 10-1 and the moving device 10-2 simultaneously perform imaging. The moving device 10-1 recognizes the position of the moving device 10-2 to operate such that the moving device 10-2 is not included in an imaging range A1 of the imaging unit 13. The moving device 10-2 recognizes the position of the moving device 10-1 to operate such that the moving device 10-1 is not included in an imaging range A2 of the imaging unit 13.

According to the moving device 10 that performs the movement operation and the imaging operation as described above, the movement and imaging can be performed without an actual rail such as a conventional dolly device. As a result, the introduction cost is suppressed.

Since the moving device 10 operates (including autonomous operation) only by setting the photographing plan, a burden of the manual operation is also reduced. For example, the user may simply adjust the moving speed of the moving device 10 and designate a tracking and photographing target by manual operation at the start of performance. The manual adjustment of the moving speed may be performed only by registering and calling the moving speed confirmed in rehearsal or the like.

In addition to the manual operations described above at the start of performance, the manual operation may be performed during performance. For example, the moving device 10 is caused to stand by at the end of the virtual route by the manual operation. The moving device 10 may be moved at a timing when performance becomes relatively exciting (e.g., main tune of song). The moving device 10 may be decelerated at timing when performance is relatively slow. The moving device 10 may be accelerated at a timing when the performance reaches excitement again. In addition, nuance of the photographing composition may also be created by the manual operation including zooming and panning.

In addition, it is also possible to perform the manual operation of causing the moving device 10 to stand by at the end of the stage ST and perform imaging by the moving device 10 only at a desired timing.

1.3 Example of Light Emission Operation

As described above, the light emission operation (light expression performed by the light emitting unit 15) of the moving device 10 is performed according to the photographing plan, the movement operation, the imaging operation, the illumination operation, and the like.

Figure 11:
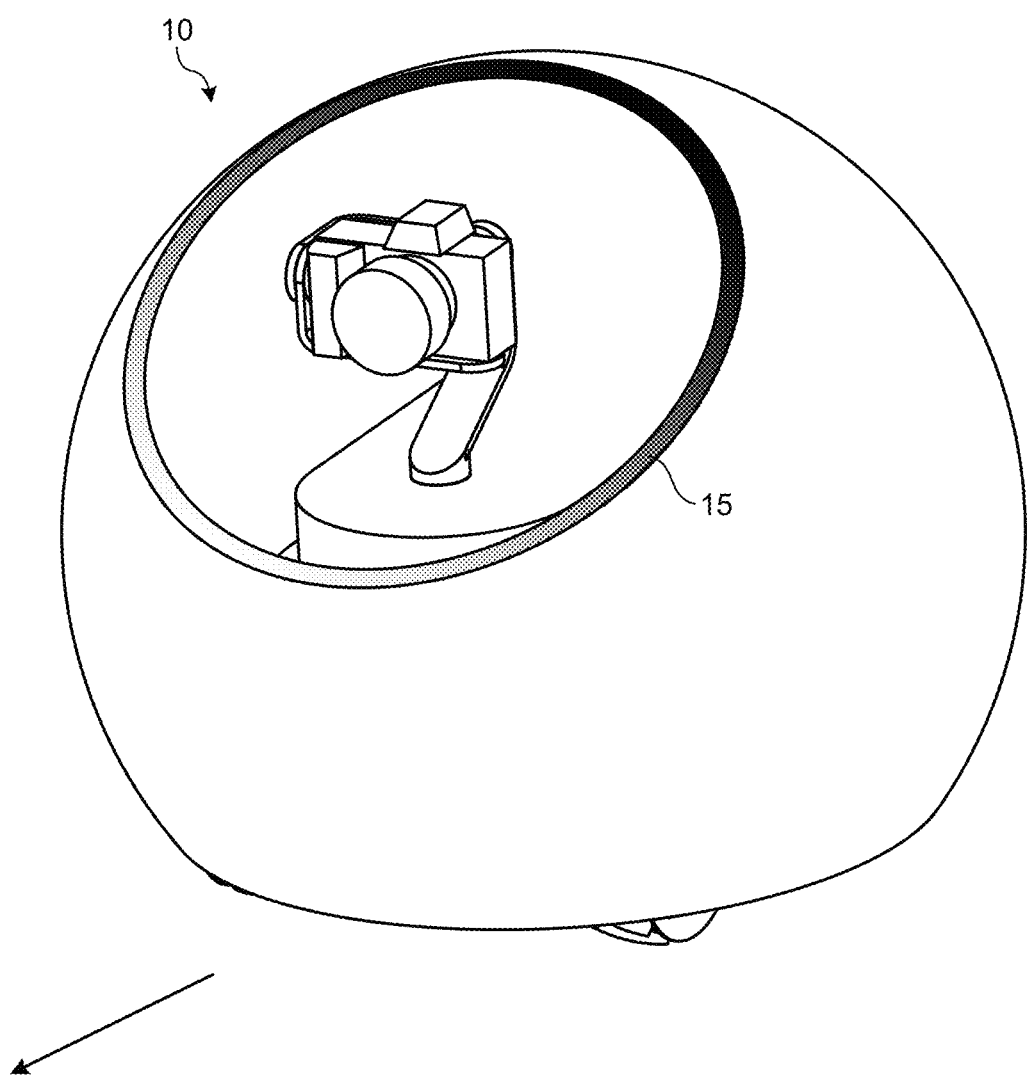
FIG. 11 is a diagram illustrating an example of a light emission operation.

In an example illustrated in FIG. 11, the control unit 19 changes a light emitting direction of the light emitting unit 15. As illustrated in FIG. 11, when the moving device 10 moves forward in an arrow direction, a front part of the light emitting unit 15 mainly emits light. Although not illustrated, when the moving device 10 moves sideway, a side part of the light emitting unit 15 mainly emits light. Not limited to the presence or absence of light emission, the light emission direction may be changed by changing a light emission color, a light emission quantity (luminance), or the like.

The control unit 19 may cause the light emitting unit 15 to express flashing. Specifically, a state in which a part of the light emitting unit 15 emits light and a state in which a part of the light emitting unit does not emit light are repeated. For example, red flashing may indicate that the moving device 10 is in a state of performing imaging (REC state).

The control unit 19 may cause the light emitting unit 15 to express countdown. Countdown light emission includes a change in light emission from a time point immediately before a time point of start or end of a predetermined operation (movement operation, imaging operation, etc.) to the time point of start or end of the predetermined operation of the moving device 10. Specifically, some parts of the light emitting unit 15 and parts therebetween emit light, and the light emitting parts decrease with time.

The control unit 19 may cause the entire light emitting unit 15 to emit light. Specifically, the entire light emitting unit 15 emits light, and some parts emit light in a mode different from other parts (different emission color, emission light quantity, etc.). In the entire light emission, the light emission quantity may be increased at a highlighting timing, and the light emission quantity may be decreased at a timing of no highlighting (timing to darken).

The control unit 19 may cause the light emitting unit 15 to emit light in cooperation with light emission from another moving device 10. Specifically, the moving device 10-1, the moving device 10-2, the moving device 10-3, and the moving device 10-4 sequentially emit light in cooperation (interlocked) to express a wave.

The above-described light emission operation may be performed simply in conjunction with the movement and imaging of the moving devices 10, or may also be incorporated into the performance. For example, the moving devices 10 perform light expression while moving according to the movement of the performers 5, thereby forming part of the performance. The moving device 10 may also perform imaging while forming part of the performance.

The photographing plan for defining the above-described light emission operation may also be set using, for example, the UI unit 32 that displays a map.

1.4 Example of Illumination Operation

As described above, the illumination operation (projection performed by the illumination unit 16) of the moving device 10 is performed according to the photographing plan, or is performed according to the movement operation, the imaging operation, the light emission operation, and the like.

Figure 12:
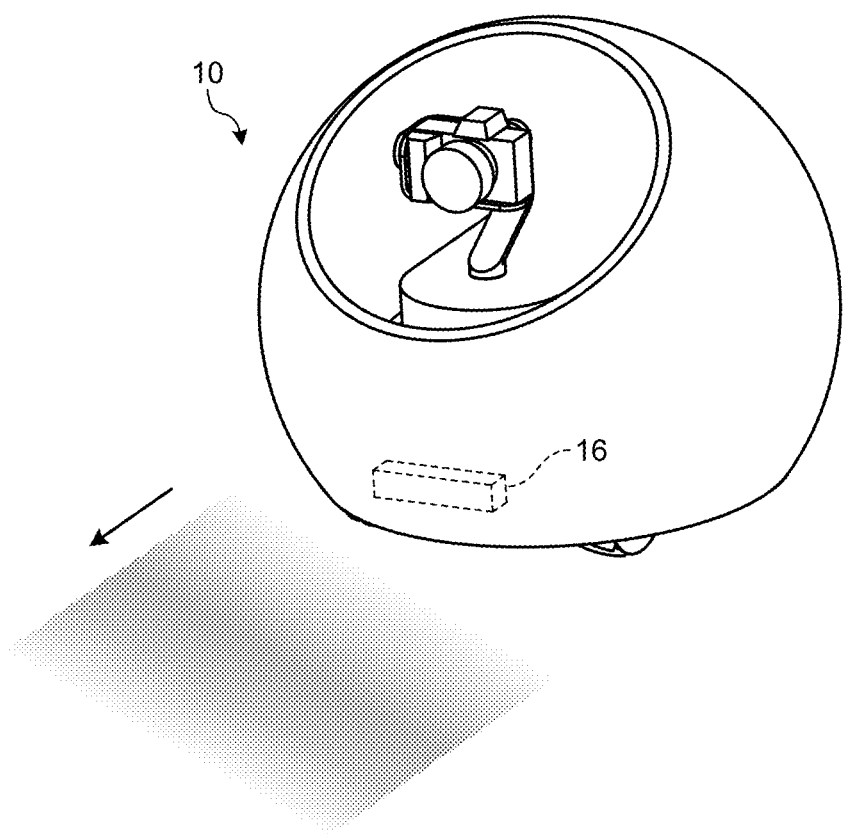
FIG. 12 is a diagram illustrating an example of an illumination operation.

In an example illustrated in FIG. 12, the control unit 19 causes the illumination unit 16 to perform projection according to the moving speed of the moving device 10. Specifically, the illumination unit 16 illuminates a region having an area corresponding to the moving speed of the moving device 10, and performs projection. As illustrated in FIG. 12, when the moving device 10 moves forward at a relatively high speed, a region having a relatively large area along the moving direction is illuminated. When the moving device 10 is moving forward at a relatively slow speed, a region having a relatively small area along the moving direction is illuminated.

The control unit 19 may cause the illumination unit 16 to perform projection with different colors. Specifically, the illumination unit 16 illuminates a near region of the moving device 10 and a far region opposite to the moving device 10 across the near region with different colors. For example, the near region indicates a photographing zone that is a range to be imaged, and the far region indicates a movement zone that is a movable range without imaging. Sizes of the near region and the far region are determined according to the imaging operation or the like of the moving device 10.

Also the above-described illumination operation may be performed simply in conjunction with the movement and imaging of the moving device 10, or may also be incorporated into the performance. Furthermore, the photographing plan that defines the illumination operation may be set using, for example, the UI unit 32 that displays a map.

Note that at least a part of the photographing plan may be automatically set. For example, a plurality of combinations of the movement operation (virtual route) and the imaging operation (photographing composition) may be registered in advance, and a photographing plan for sequentially executing the combinations in a predetermined period may be automatically generated. For various operations without being limited to the movement operation and the imaging operation, a predetermined operation (default operation) may be automatically incorporated into the photographing plan. A combination of a plurality of default operations may be automatically incorporated into the photographing plan. Before and after operations set by the user, an operation connecting the set operations may be automatically incorporated into the photographing plan.

1.5 Correction of Unintended Blur

The control unit 19 controls a photographing range RA of the moving device 10 based on a difference between a photographing plan input to the moving device 10 and an actual photographing state. The actual photographing state is estimated from the sensor information detected by the sensor 14. The photographing plan includes information indicating the movement trajectory and the photographing attitude of the imaging unit 13. The movement trajectory of the imaging unit 13 matches the virtual route of the moving device 10. The photographing attitude of the imaging unit 13 means an attitude of the imaging unit 13 supported by the rotation support mechanism 13RS.

For example, the sensor information includes an image AI captured by the imaging unit 13. The control unit 19 detects a deviation between a change MP of an image PI estimated based on the photographing plan and a change MA of actual image AI based on the sensor information as the above-described difference. This difference represents an unintended blur of the image AI caused by vibration or the like of the moving device 10. The unintended blur may occur due to the following causes.

A. The moving device 10 vibrates due to an uneven floor, and vibration is transmitted to the imaging unit 13.
B. An inertial force is applied to the imaging unit 13 at the time of acceleration or deceleration, and the position of the imaging unit 13 is deviated.
C. Vibration due to error generated in processes of self-position estimation, route calculation, and movement control is applied to the imaging unit 13.
D. Vibration is applied to the imaging unit 13 by the operation to avoid collision due to detection of an unscheduled obstacle.

The control unit 19 corrects the blur of the image AI using, for example, a known electronic camera shake correction technology based on the above-described difference. For example, the control unit 19 sets an area narrower than a visual field range FV as the photographing range RA to be recorded on a recording medium. The visual field range FV is a possible photographing range determined by the angle of view of the imaging unit 13. The control unit 19 reduces the above-described deviation by changing the position of the photographing range RA in the visual field range FV.

Note that a method of changing the position of the photographing range RA is not limited to the above. For example, the position of the photographing range RA can be changed by changing the photographing attitude of the moving device 10. Examples of the method of changing the photographing attitude include a method of controlling a photographing angle of the moving device 10 by causing the moving device 10 to perform the rotational movement (spinning). The position of the photographing range RA can be changed by moving the moving device 10 and controlling the photographing position of the moving device 10.

FIGS. 13A, 13B, 14, 15A, 15B, and 16 are diagrams illustrating examples of a blur correction process.

In FIGS. 13A and 13B, a frame F1 and a frame F2 represent two consecutive frames during photographing. For example, the control unit 19 detects a change of the image based on a change of a position of a photographing target SU. The photographing target SU may be a moving object with movement or a still object without movement. In a case where the photographing target SU is the moving object, the photographing plan is generated based on a movement plan of the photographing target SU. The control unit 19 estimates the position of the photographing target SU in the visual field range FV in consideration of the movement of the photographing target SU.

In an example in FIG. 14, the image AI changes such that the photographing target SU moves from left to right within the visual field range FV. The same applies to a change of the image PI. The change MA of the image AI and the change MP of the image PI match. In this case, the control unit 19 determines that the change MA of the image AI is an intended change according to the photographing plan, and does not perform the blur correction process.

In examples in FIGS. 15A, 15B, and 16, a deviation occurs between the change MA of the image AI and the change MP of the image PI. In this case, the control unit 19 determines that the change MA of the image AI includes an unintended change not according to the photographing plan, and performs the blur correction process. The blur correction process is performed by changing the photographing range RA within the visual field range FV so that the unintended change of the image AI is canceled.

1.6 Example of Process

Figure 17:
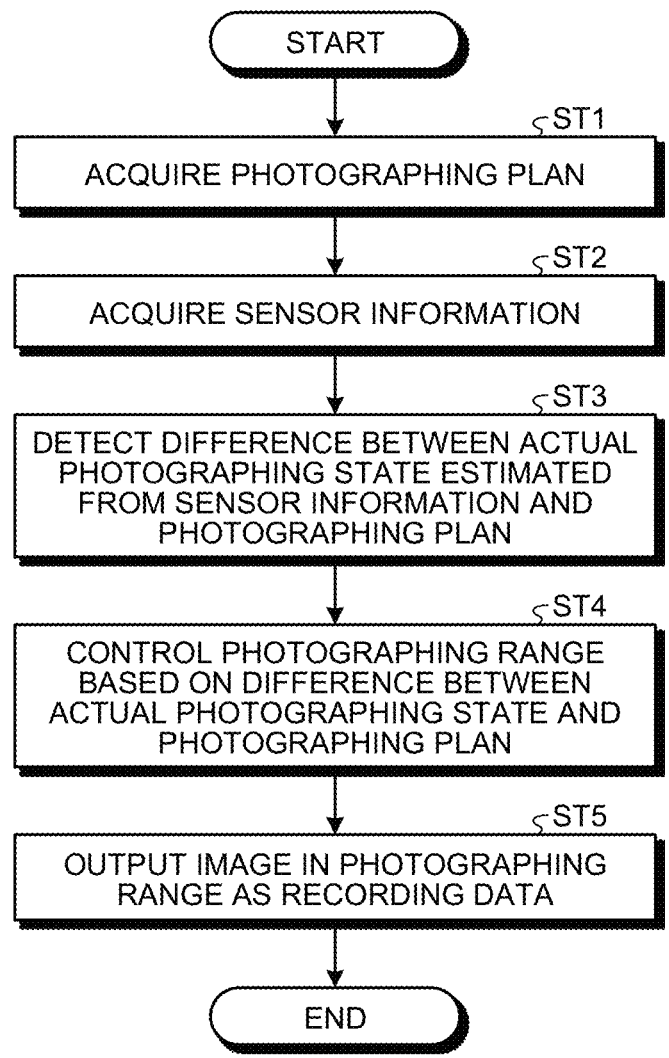
FIG. 17 is a flowchart illustrating an example of information processing for performing blur correction.

FIG. 17 is a flowchart illustrating an example of information processing for performing blur correction.

In Step ST1, the control unit 19 acquires the photographing plan generated by the operation instruction device 30. In Step ST2, the control unit 19 acquires the sensor information detected by the sensor 14. The sensor information includes, for example, the image AI captured by the imaging unit 13.

In Step ST3, the control unit 19 detects a difference between the actual photographing state estimated from the sensor information and the photographing plan. The difference is detected as, for example, a difference between a change of the image PI estimated according to the photographing plan and a change of the actual image AI based on the sensor information. In Step ST4, the control unit 19 controls the photographing range RA based on the above-described difference.

For example, the control unit 19 sets a central portion of the visual field range FV as a default position of the photographing range RA. The control unit 19 sets, for each frame, a shift amount of the photographing range RA from the default position. For example, a shift amount S1 is a shift amount of the photographing range RA in the frame F1, and a shift amount S2 is a shift amount of the photographing range RA in the frame F2. The control unit 19 calculates a deviation R of the image AI between the frame F1 and the frame F2. The control unit 19 calculates a deviation I of the image PI between the frame F1 and the frame F2 based on the photographing attitude of imaging unit 13 in frame F1 and frame F2.

The deviation of the image AI to be recorded in the frame F1 and the frame F2 (image AI in the photographing range RA) is (R−S1+S2). The control unit 19 determines the shift amount S1 and the shift amount S2 so that the deviation of the image AI to be recorded becomes equal to the deviation I of the image PI. For example, when the shift amount S1 of the frame F1 is known, the shift amount S2 of the frame F2 immediately after the frame F1 is calculated according to the following equation, using the deviation R and the deviation I that are also known.

$$S2 = S1 + I - R$$

For example, the control unit 19 sets the shift amount of the photographing range RA of a head frame to 0. The control unit 19 sequentially calculates the shift amount of the photographing range RA of subsequent frames using the shift amount S1 of the photographing range RA of an immediately preceding frame.

In Step ST5, the control unit 19 outputs an image IM captured in the photographing range RA as recording data to the recording medium.

1.7 Example of Hardware Configuration

Figure 18:
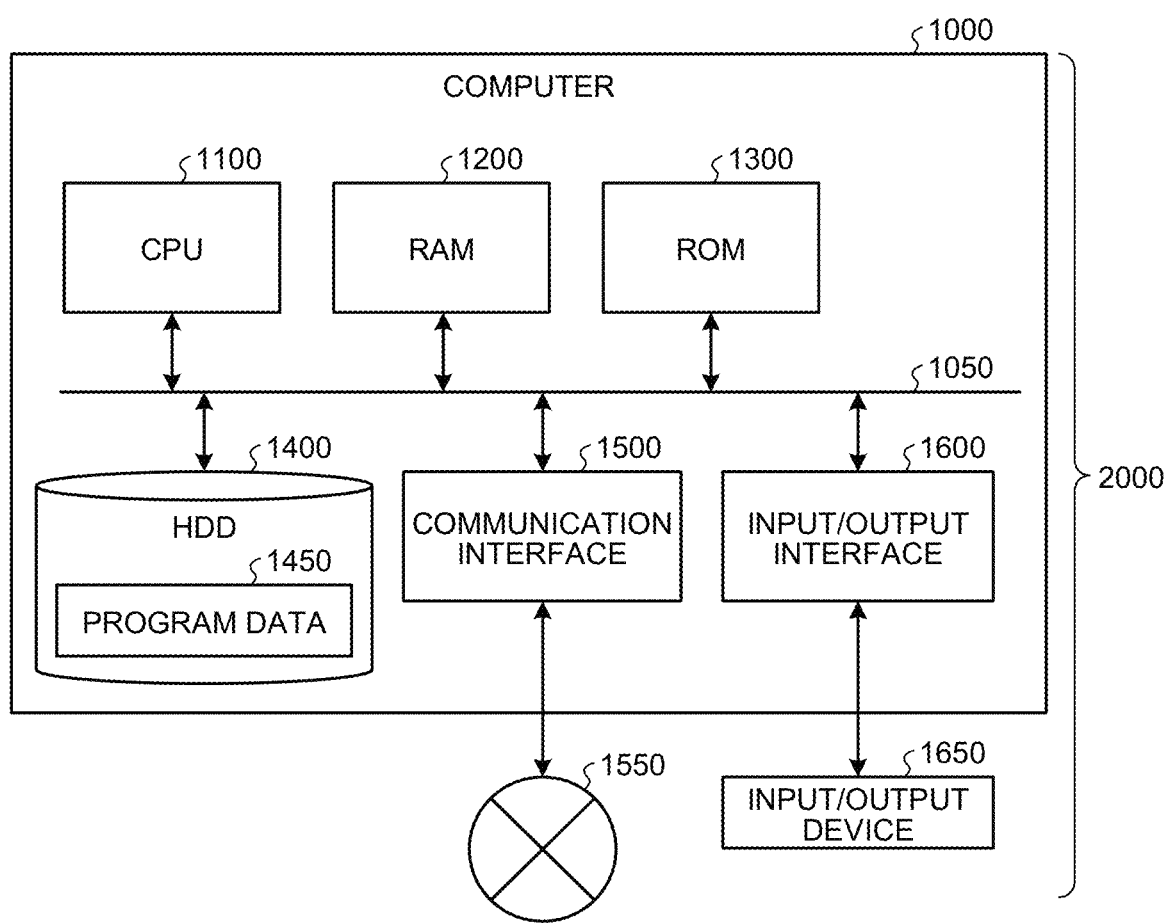

FIG. 18 is a diagram illustrating an example of a hardware configuration of an operation instruction device or the like. For example, the operation instruction device 30 and the control unit 19 of the moving device 10 are realized by a computer 1000. The computer 1000 includes a CPU 1100, a RAM 1200, a read only memory (ROM) 1300, a hard disk drive (HDD) 1400, a communication interface 1500, and an input/output interface 1600. Each unit of the computer 1000 is connected by a bus 1050. Note that the control unit 19 of the moving device 10 may not include the input/output interface 1600. Since the moving device 10 includes the communication unit 18, the control unit 19 may not include the communication interface 1500.

The CPU 1100 operates based on a program stored in the ROM 1300 or the HDD 1400, and controls each unit. For example, the CPU 1100 develops a program stored in the ROM 1300 or the HDD 1400 into the RAM 1200, and executes processes corresponding to various programs.

The ROM 1300 stores a boot program such as a basic input output system (BIOS) executed by the CPU 1100 when the computer 1000 is activated, a program dependent on hardware of the computer 1000, and the like.

The HDD 1400 is a computer-readable recording medium that non-transiently records a program executed by the CPU 1100, data used by the program, and the like. Specifically, the HDD 1400 is a recording medium that records the information processing program according to the present disclosure, which is an example of program data 1450.

The communication interface 1500 is an interface to connect the computer 1000 with an external network 1550 (e.g., the Internet). For example, the CPU 1100 receives data from another device or transmits data generated by the CPU 1100 to another device via the communication interface 1500.

The input/output interface 1600 is an interface for connecting an input/output device 1650 and the computer 1000. The moving device 10 includes an information processing apparatus 2000 including the computer 1000 and the input/output device 1650.

For example, the CPU 1100 receives data from the input/output device such as a keyboard, a mouse, or a microphone (microphone) via the input/output interface 1600. In addition, the CPU 1100 transmits the data to an output device such as a display, a speaker, or a printer via the input/output interface 1600. Furthermore, the input/output interface 1600 may function as a media interface that reads a program or the like recorded in a predetermined recording medium (medium). The medium is, for example, an optical recording medium such as a digital versatile disc (DVD) or a phase change rewritable disk (PD), a magneto-optical recording medium such as a magneto-optical disk (MO), a tape medium, a magnetic recording medium, a semiconductor memory, or the like.

For example, in a case where the computer 1000 functions as the operation instruction device 30, the CPU 1100 of the computer 1000 implements the functions of the map generation unit 31, the UI unit 32, and the distribution unit 33 by executing a program loaded on the RAM 1200. In addition, the HDD 1400 stores a program for causing the computer to function as the operation instruction device 30. Note that the CPU 1100 reads the program data 1450 from the HDD 1400 and executes the program data 1450. As another example, these programs may be acquired from another device via the external network 1550.

For example, in a case where the computer 1000 functions as the control unit 19 of the moving device 10, the CPU 1100 of the computer 1000 implements the functions of the control unit 19 by executing a program loaded on the RAM 1200. In addition, the HDD 1400 stores a program for causing the computer to function as the control unit 19. Note that the CPU 1100 reads the program data 1450 from the HDD 1400 and executes the program data 1450. As another example, these programs may be acquired from another device via the external network 1550.

The technical scope of the present disclosure is not limited to the above-described embodiment, and various modifications can be made without departing from the gist of the present disclosure.

In the above embodiment, an example has been described in which the imaging system 1 is used for a live music event. However, the application of the imaging system 1 is not limited to the live music event. For example, the imaging system 1 may be used for various purposes such as sports, weddings, and monitoring.

In the above embodiment, an example has been described in which the imaging system 1 includes the same number of moving devices 10 as the number of the performers 5. However, the number of the moving devices 10 may be different from the number of the performers 5. The number of moving devices 10 may be one.

In the above embodiment, an example has been described in which the environment sensor 20 recognizes the position of the performer 5 by recognizing the tag T. However, the environment sensor 20 may recognize the performer 5 without using the tag T. In that case, the imaging system 1 may not include the tag T.

Arrangement of components of the moving device 10 is not limited to the above embodiment. The components may be arranged in various ways as long as the function of the moving device 10 can be realized. In the same way, an external shape of the moving device 10 is not limited to the above embodiment.

2. Effects

The information processing apparatus 2000 includes the control unit 19. The control unit 19 controls the photographing range of the imaging unit 13 based on a difference between the photographing plan of the imaging unit 13 and the actual photographing state estimated from the sensor information. In an information processing method of the present embodiment, the computer 1000 executes processing of the information processing apparatus 2000. A program of the present embodiment causes a computer to implement the processing of the information processing apparatus 2000. The moving device 10 of the present embodiment includes the imaging unit 13 and the information processing apparatus 2000 described above.

According to this configuration, only an unintended blur of the image AI is selectively suppressed based on the difference between the photographing plan and the actual photographing state. Therefore, appropriate image recording data according to the photographing plan is acquired.

The photographing plan includes information indicating the movement trajectory and the photographing attitude of the imaging unit 13.

According to this configuration, appropriate image data corresponding to the planned movement trajectory and photographing attitude of the imaging unit 13 is acquired.

The sensor information includes the image AI captured by the imaging unit 13. The control unit 19 detects deviation between the change of the image PI estimated according to the photographing plan and the change of the actual image AI based on the sensor information as the difference.

According to this configuration, a magnitude of the blur is accurately detected based on the deviation of the image AI.

The control unit 19 sets an area narrower than the visual field range FV as the photographing range RA to be recorded on the recording medium. The control unit 19 reduces the above-described deviation by changing the position of the photographing range RA in the visual field range FV.

According to this configuration, a blur is easily suppressed.

The photographing plan is generated based on the movement plan of the photographing target SU.

According to this configuration, an appropriate image according to the movement plan of the photographing target SU is captured.

Note that the effects described in the present specification are merely examples and not limited, and other effects may be provided.

3. Modifications

3.1 First Modification

Figure 19:
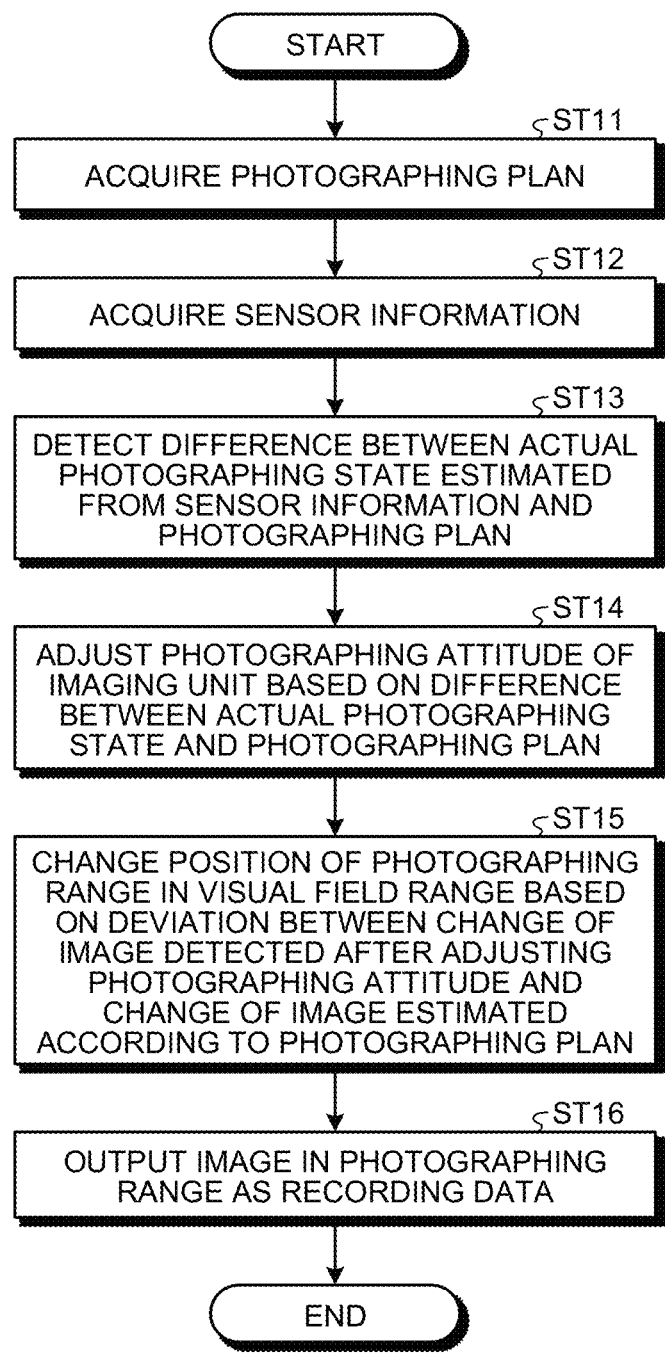
FIG. 19 is a flowchart illustrating a modification of the blur correction process.

FIG. 19 is a flowchart illustrating a modification of the blur correction process. FIG. 19 differs from FIG. 17 in Steps ST14 and ST15. Steps ST11, ST12, ST13, and ST16 are the same as Steps ST1, ST2, ST3, and ST5 in FIG. 17.

In the above-described embodiment, the blur of the image AI is reduced by a software method. However, the blur of the image AI may be reduced by a hardware method. In an example in FIG. 19, the blur is corrected using the rotation support mechanism 13RS before the blur correction process described above.

For example, in Step ST14, the control unit 19 adjusts the photographing attitude of the imaging unit 13 based on a difference between the actual photographing state and the photographing plan (deviation between the change of the image PI estimated based on the photographing plan and the change of the actual image AI based on the sensor information). The photographing attitude is adjusted by controlling a rotation amount of the neck rotation shaft 13a and a rotation amount of the three-axis gimbal 13b included in the rotation support mechanism 13RS. The photographing attitude may be adjusted by moving the moving device 10 to control the photographing position of the moving device 10.

In Step ST15, the control unit 19 reduces the deviation remaining after the adjustment of the photographing attitude by changing the position of the photographing range RA. For example, the blur of the image AI is corrected based on the deviation between the change MA of the image AI of the imaging unit 13 detected after adjusting the photographing attitude and the change MP of the image PI estimated based on the photographing plan. The blur correction process in Step ST15 is performed by changing the position of the photographing range RA in the visual field range FV, similarly to the blur correction process described in FIG. 17.

According to this configuration, it is possible to further suppress the blur by using the hardware method and the software method.

3.2 Second Modification

Figure 20:
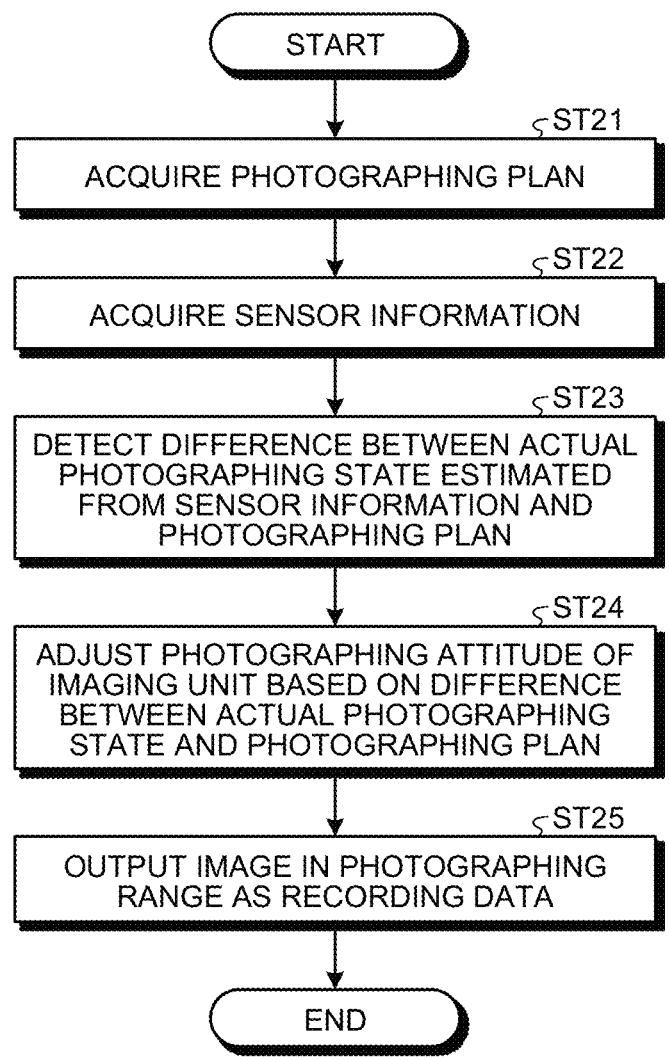
FIG. 20 is a flowchart illustrating a modification of the blur correction process.

FIG. 20 is a flowchart illustrating a modification of the blur correction process. FIG. 20 is different from FIG. 17 in Step ST24. Steps ST21, ST22, ST23, and ST25 are the same as Steps ST1, ST2, ST3, and ST5 in FIG. 17.

In the present modification, the blur of the image AI is reduced by a hardware method. For example, in Step ST24, the control unit 19 adjusts the photographing attitude of the imaging unit 13 based on a difference between the actual photographing state and the photographing plan (deviation between the change of the image PI estimated based on the photographing plan and the change of the actual image AI based on the sensor information). As a result, the control unit 19 reduces the above-described deviation. The photographing attitude is adjusted by controlling a rotation amount of the neck rotation shaft 13a and a rotation amount of the three-axis gimbal 13b included in the rotation support mechanism 13RS.

In a case where the blur is accurately corrected only by the rotation support mechanism 13RS, a sufficient effect can be obtained also by the method of the present modification. In this configuration, since the entire visual field range FV can be set as the photographing range RA, resolution of recording data is increased.

3.3 Third Modification

Figure 21:
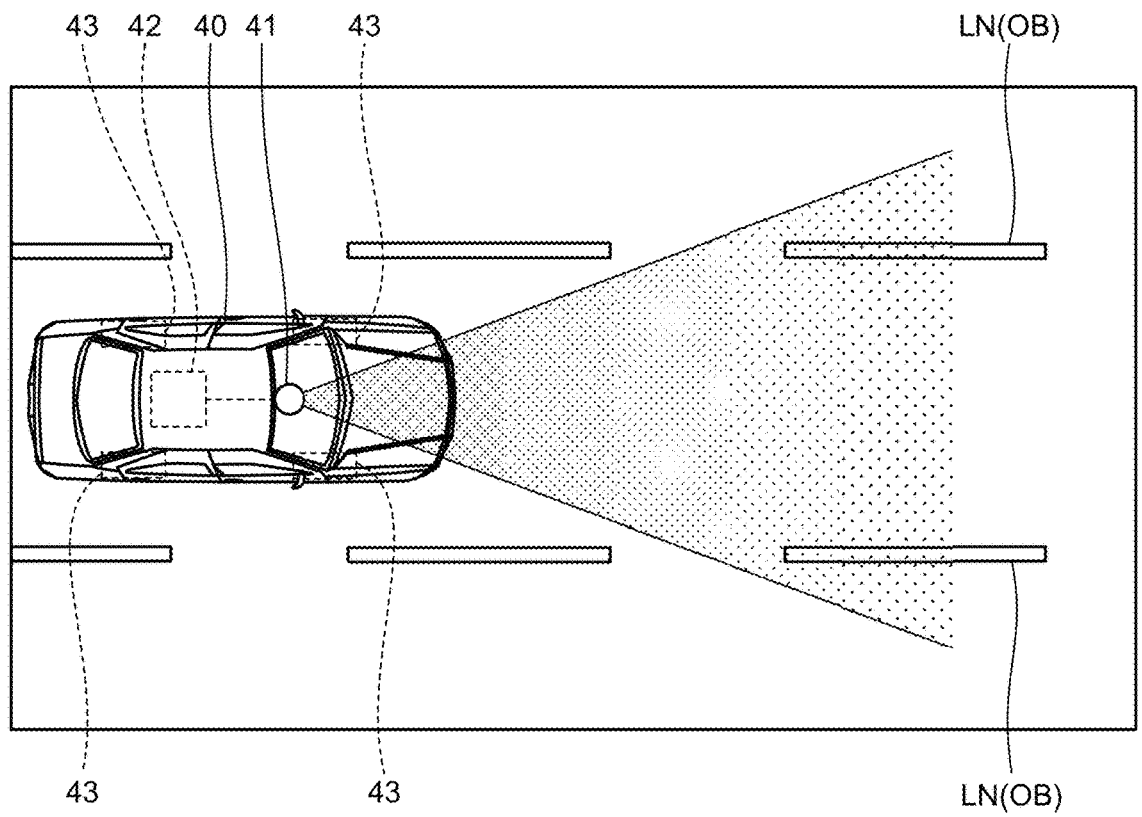
FIG. 21 is a diagram illustrating a modification of a target to apply the blur correction process.
Figure 22:
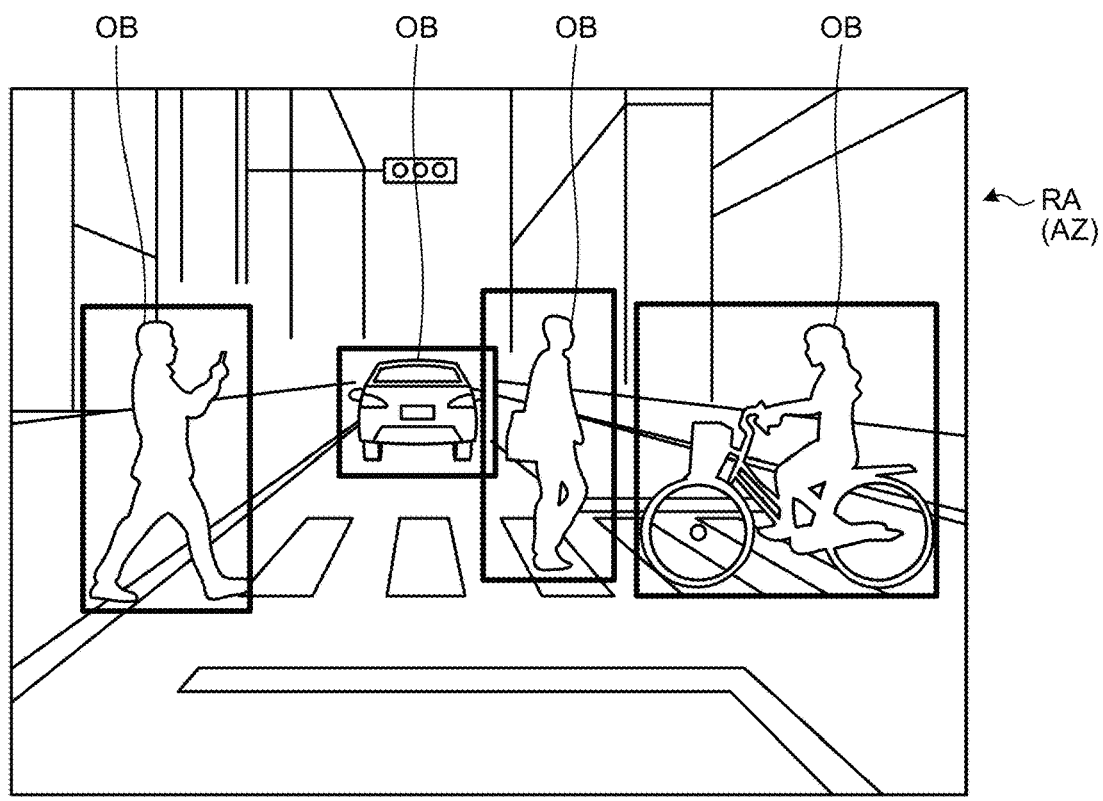
FIG. 22 is a diagram illustrating a modification of a target to apply the blur correction process.
Figure 23:
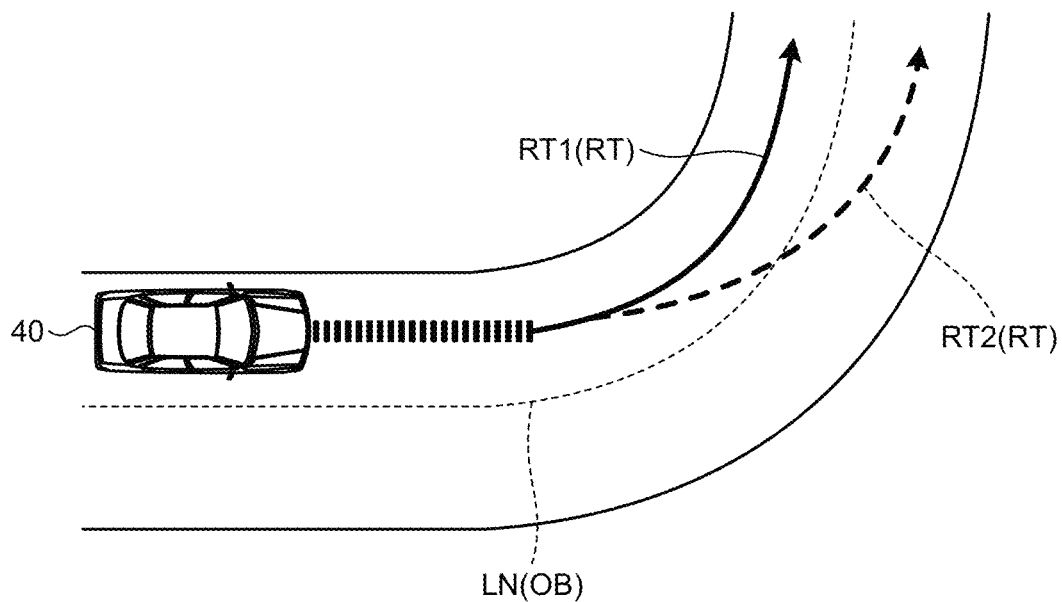
FIG. 23 is a diagram illustrating a modification of a target to apply the blur correction process.

FIGS. 21 to 23 are diagrams illustrating modifications of a target to apply the blur correction process.

In the above-described embodiment, an example has been described in which the blur correction process of the present disclosure is applied to a movable photographing device for photographing the performer 5. However, a target to apply the blur correction process is not limited thereto. In the present modification, the method of the present disclosure is used for the blur correction process of an in-vehicle camera.

As illustrated in FIG. 21, a vehicle 40 includes an imaging unit 41 and a control unit 42. The imaging unit 41 and the control unit 42 have functions similar to those of the imaging unit 13 and the control unit 19 illustrated in FIG. 3. Although not illustrated, the vehicle 40 includes a moving mechanism that moves the imaging unit 41 and a rotation support mechanism that controls an photographing attitude of the imaging unit 41. The moving mechanism includes, for example, an engine, a motor, a wheel 43, a steering wheel, and the like. The driver operates the moving mechanism to move the vehicle 40. The control unit 42 is realized by the computer 1000 illustrated in FIG. 18. The vehicle 40 includes the information processing apparatus 2000 illustrated in FIG. 18. The vehicle 40 has an aspect of the movable photographing device that moves while recognizing surroundings based on an image captured by the imaging unit 41.

The vehicle 40 is equipped with a driver assistance system such as an advanced driver assistance system (ADAS) that supports the driving operation by the driver. The control unit 42 provides driving support using the driver assistance system.

For example, as illustrated in FIG. 21, the imaging unit 41 captures an object OB on a road such as a white line LN. The control unit 42 recognizes a travel lane based on an image of the object OB captured by the imaging unit 41. As illustrated in FIG. 22, the control unit 42 recognizes the object OB such as a pedestrian, a car, a bicycle, and a sign present around the vehicle 40 based on the image AI captured by the imaging unit 41. The control unit 42 tracks a behavior of the object OB and implements a measure to avoid a risk. As illustrated in FIG. 23, the control unit 42 sets a travel route RT of the vehicle 40 based on a position of the object OB in the image AI. The control unit 42 supports the driver's driving operation so that the vehicle 40 moves on the set travel route RT.

The control unit 42 detects the object OB using a known object recognition technology employing a neural network or the like. In this case, an unintended blur of the image AI due to vibration or the like during traveling may result in inability to detect the object OB accurately or difficulty to track the object OB. Therefore, the control unit 19 detects an object based on the recording data in which the unintended blur is corrected. For example, the control unit 42 calculates a movement trajectory of the imaging unit 41 based on the travel route of the vehicle 40. The control unit 42 detects a deviation between the change of the image PI estimated based on the movement trajectory of the imaging unit 41 and a change of the actual image AI. The control unit 42 sets an area narrower than the visual field range of the imaging unit 41 as the photographing range RA to be recorded on the recording medium. The control unit 42 changes the position of the photographing range RA in the visual field range to reduce the above-described deviation.

The movement trajectory of the imaging unit 13 is calculated, for example, based on the travel route determined by the driver assistance system. According to this configuration, the information regarding the movement trajectory is automatically generated without requiring the driver to manually prepare the photographing plan. In a case where the travel route is not set by the driver assistance system, the movement trajectory of the imaging unit 13 is predicted, for example, based on an operation by the driver who operates the moving mechanism (e.g., steering wheel). For example, in the example in FIG. 23, when an amount of steering wheel operation by the driver is large, it is predicted that the vehicle 40 moves on the travel route RT1. When an amount of steering wheel operation by the driver is small, it is predicted that the vehicle 40 moves on the travel route RT2. The control unit 42 estimates the movement trajectory of the imaging unit 41 based on the travel route RT of the vehicle. Also in this case, the information regarding the movement trajectory is automatically generated without requiring the driver to manually prepare the photographing plan.

3.4 Fourth Modification

Figure 24:
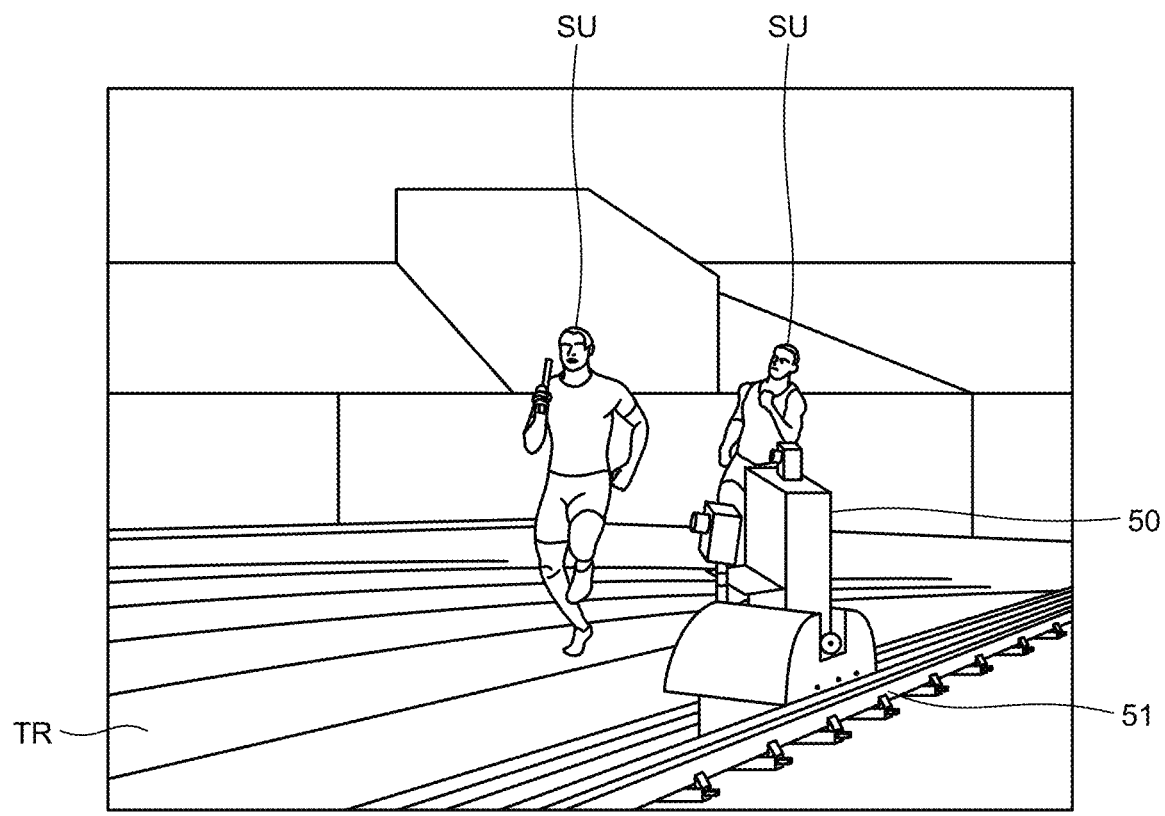
FIG. 24 is a diagram illustrating a modification of a target to apply the blur correction process.

FIG. 24 is a diagram illustrating a modification of a target to apply the blur correction process.

In an example in FIG. 24, the blur correction process of the present disclosure is applied to photographing of sports. An imaging unit 50 moves on a rail 51 installed beside a track TR to capture an image of the photographing target SU. In order to correct an unintended blur of the image while moving, the blur correction process of the present disclosure is applied. In the example in FIG. 24, the method of the present disclosure is applied to photographing of a short-distance race but applicable sports are not limited to the short-distance race. The method of the present disclosure may be applied to photograph other sports such as marathon, soccer, and basketball.

When a movement route of the photographing target SU can be predicted to some extent, such as a marathon or short-distance race, the method of the present disclosure can be applied by generating a photographing plan based on a predicted movement route. In a case where it is difficult to predict movement of the photographing target SU, such as soccer and basketball, the method of the present disclosure can be applied, although the movement of the photographing target SU is difficult to predict, as long as the photographing plan itself can be generated. For example, the method of the present disclosure can be applied when a photographing plan is generated to cause the visual field range of the imaging unit to follow a direction of movement with a delay after a direction in which the photographing target SU has moved is detected, instead of a photographing plan that strictly follows the photographing target SU.

[Supplementary Note]

The present technology can also have the following configurations.

(1)

An information processing apparatus comprising a control unit configured to control a photographing range of an imaging unit based on a difference between a photographing plan of the imaging unit and an actual photographing state estimated from sensor information.

(2)

The information processing apparatus according to (1), wherein
the photographing plan includes information indicating a movement trajectory and a photographing attitude of the imaging unit.

(3)

The information processing apparatus according to (2), wherein
the sensor information includes an image captured by the imaging unit, and
the control unit detects a deviation between a change of the image estimated according to the photographing plan and an actual change of the image based on the sensor information, the deviation being detected as the difference.

(4)

The information processing apparatus according to (3), wherein
the control unit sets an area narrower than a visual field range as the photographing range to be recorded on a recording medium, and changes a position of the photographing range in the visual field range to reduce the deviation.

(5)

The information processing apparatus according to (4), wherein
the control unit adjusts the photographing attitude of the imaging unit based on the deviation, and reduces the deviation remaining after adjustment of the photographing attitude by changing the position of the photographing range.

(6)

The information processing apparatus according to any one of (3) to (5), wherein
the control unit reduces the deviation by adjusting the photographing attitude of the imaging unit.

(7)

The information processing apparatus according to any one of (2) to (5), wherein
the photographing plan is generated based on a movement plan of a photographing target.

(8)

The information processing apparatus according to any one of (2) to (5), wherein
the movement trajectory is predicted based on an operation of a driver operating a moving mechanism of the imaging unit.

(9)

The information processing apparatus according to any one of (2) to (5), wherein
the movement trajectory is calculated based on a travel route determined by a driver assistance system of a driver operating a moving mechanism of the imaging unit.

(10)

An information processing method executed by a computer, the information processing method comprising:
controlling a photographing range of an imaging unit based on a difference between a photographing plan of the imaging unit and an actual photographing state estimated from sensor information.

(11)

A program causing a computer to implement:
controlling a photographing range of an imaging unit based on a difference between a photographing plan of the imaging unit and an actual photographing state estimated from sensor information.

(12)

A moving device comprising:
an imaging unit; and
the information processing apparatus according to any one of (1) to (9).

REFERENCE SIGNS LIST

10 MOVING DEVICE
13 IMAGING UNIT
19 CONTROL UNIT
41 IMAGING UNIT
42 CONTROL UNIT
43 WHEEL (MOVING MECHANISM)
2000 INFORMATION PROCESSING APPARATUS
AI IMAGE
FV VISUAL FIELD RANGE
PI IMAGE
RA PHOTOGRAPHING RANGE

The invention claimed is:

1. An information processing apparatus, comprising:
a central processing unit (CPU) configured to:
estimate an actual photographing state from sensor information, wherein the sensor information includes an image captured by an image sensor;
control a photographing range of the image sensor based on a difference between a photographing plan of the image sensor and the estimated actual photographing state, wherein the photographing plan includes information indicating a movement trajectory and a photographing attitude of the image sensor;
detect a deviation between a change of the image based on the photographing plan and an actual change of the image based on the sensor information, wherein the deviation corresponds to the difference;
adjust the photographing attitude of the image sensor based on the deviation; and
reduce the deviation based on the adjustment in the photographing attitude of the image sensor.

2. The information processing apparatus according to claim 1, wherein the CPU is further configured to:
set an area narrower than a visual field range as the photographing range to be recorded on a recording medium;
change a position of the photographing range in the visual field range; and
reduce the deviation based on the change in the position of the photographing range.

3. The information processing apparatus according to claim 2, wherein the CPU is further configured to
reduce the deviation remaining after the adjustment of the photographing attitude.

4. The information processing apparatus according to claim 1, wherein the photographing plan is based on a movement plan of a photographing target.

5. The information processing apparatus according to claim 1, wherein the movement trajectory is based on an operation of a driver who operates a moving mechanism of the image sensor.

6. The information processing apparatus according to claim 1, wherein the movement trajectory is based on a travel route determined by a driver assistance system of a driver who operates a moving mechanism of the image sensor.

7. An information processing method, comprising:
in an information processing apparatus:
estimating an actual photographing state from sensor information, wherein the sensor information includes an image captured by an image sensor;
controlling a photographing range of the image sensor based on a difference between a photographing plan of the image sensor and the estimated actual photographing state, wherein the photographing plan includes information indicating a movement trajectory and a photographing attitude of the image sensor;
detecting a deviation between a change of the image based on the photographing plan and an actual change of the image based on the sensor information, wherein the deviation corresponds to the difference;
adjusting the photographing attitude of the image sensor based on the deviation; and
reducing the deviation based on the adjustment in the photographing attitude of the image sensor.

8. A non-transitory computer-readable medium having stored thereon, computer-executable instructions which, when executed by a computer, cause the computer to execute operations, the operations comprising:
estimating an actual photographing state from sensor information, wherein the sensor information includes an image captured by an image sensor;
controlling a photographing range of the image sensor based on a difference between a photographing plan of the image sensor and the estimated actual photographing state, wherein the photographing plan includes information indicating a movement trajectory and a photographing attitude of the image sensor;
detecting a deviation between a change of the image based on the photographing plan and an actual change of the image based on the sensor information, wherein the deviation corresponds to the difference;
adjusting the photographing attitude of the image sensor based on the deviation; and
reducing the deviation based on the adjustment in the photographing attitude of the image sensor.

9. A moving device, comprising:
the image sensor; and
the information processing apparatus according to claim 1.

* * * * *